United States Patent [19]

Rasmussen et al.

[11] Patent Number: 5,184,185
[45] Date of Patent: Feb. 2, 1993

[54] METHOD FOR DUPLEX PRINTING SCHEDULING SYSTEM COMBINING FINISHER INTERSET SKIPPED PITCHES WITH DUPLEX SHEET SCHEDULING

[75] Inventors: David L. Rasmussen; Michael E. Farrell, both of Fairport; Pedro R. Ortiz, Webster, all of N.Y.

[73] Assignee: Xerox Corporation, Stamford, Conn.

[21] Appl. No.: 752,123

[22] Filed: Aug. 29, 1991

[51] Int. Cl.$^5$ ............................................ G03G 21/00
[52] U.S. Cl. ...................................... 355/308; 271/286
[58] Field of Search .............. 355/308, 309, 313, 319, 355/324; 271/285, 286, 291

[56] References Cited

U.S. PATENT DOCUMENTS

| | | |
|---|---|---|
| 4,453,841 | 6/1984 | Bobick et al. ................... 355/319 X |
| 4,595,187 | 6/1986 | Bober ................................... 270/37 |
| 4,708,469 | 11/1987 | Bober et al. .................... 355/308 X |
| 4,727,402 | 2/1988 | Smith .................................. 355/319 |
| 4,918,490 | 4/1990 | Stemmle .............................. 355/318 |
| 5,095,342 | 3/1992 | Farrell et al. ........................ 355/319 |
| 5,095,369 | 3/1992 | Ortiz et al. ..................... 355/324 X |

Primary Examiner—Fred L. Braun
Attorney, Agent, or Firm—Oliff & Berridge

[57] ABSTRACT

Gaps which naturally exist in the output of printed copy sheets from a duplex paper path due to duplex printing are selectively combined with interset interval skipped pitches so as to provide an appropriate interset interval between each set of printed copy sheets output from a printer, while minimizing the number of skipped pitches which actually need to be scheduled.

10 Claims, 14 Drawing Sheets

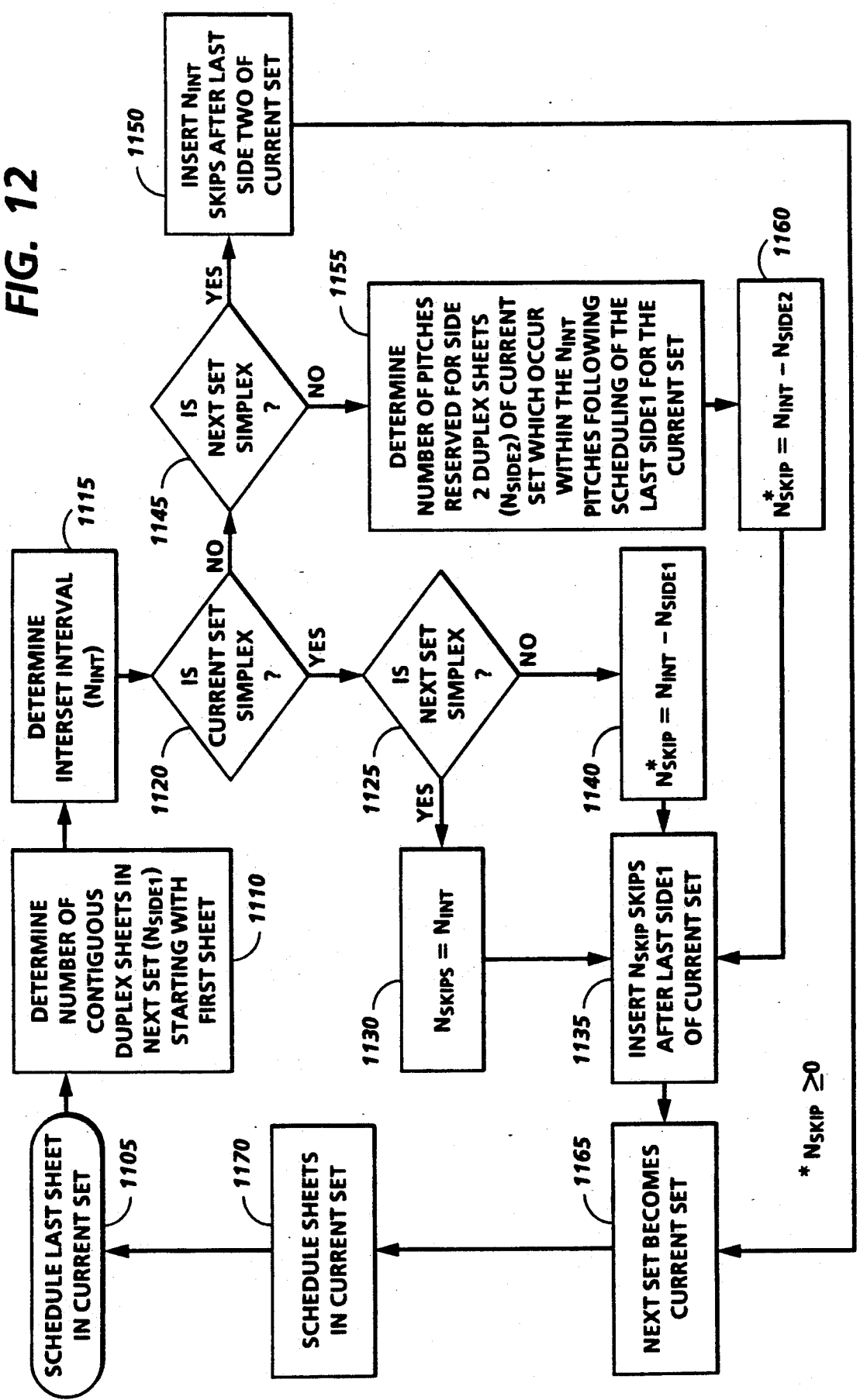

METHOD FOR DUPLEX PRINTING SCHEDULING SYSTEM COMBINING FINISHER INTERSET SKIPPED PITCHES WITH DUPLEX SHEET SCHEDULING

CROSS REFERENCES

This application is related to U.S. Pat. application Ser. No. 07/590,236, filed Sep. 28, 1990, now U.S. Pat. No. 5,095,342, to Michael E. Farrell et al entitled "METHODS FOR SHEET SCHEDULING IN AN IMAGING SYSTEM HAVING AN ENDLESS DUPLEX PAPER PATH LOOP". This application is also related to U.S. Pat. application Ser. No. 07/752,108 (Attorney Docket No. JAO 26716) to Michael E. Farrell et al entitled "DUAL MODE DUPLEX PRINTING SCHEDULING SYSTEM", filed concurrently herewith. The disclosures of the above listed applications are incorporated herein by reference.

BACKGROUND OF THE INVENTION

1. Field of the Invention

The present invention is directed generally to printing duplex and simplex copy sheets from electronic page information, especially suitable for low cost electrostatographic, ink jet, ionographic or other on-demand page printers with an endless duplex paper path loop. More particularly, the present invention relates to such printers which are integrated with on-line finishing devices which cannot immediately receive copy sheets from a subsequent set when performing its finishing operations on a current set of copy sheets (i.e., finishing devices which require an interset interval so that a first set is sufficiently cleared out of the way for the finishing device to begin receiving sheets from a second, subsequent set).

2. Description of Related Art

The terminology "copiers", and "copies", as well as "printers" and "prints", is used alternatively herein. The terminology "imaging" and "marking" is used alternatively herein and refers to the entire process of putting an image (digital or analog source) onto paper. The image can then be permanently fixed to the paper by fusing, drying, or other means. It will be appreciated that the invention may apply to almost any system in which the images are made electronically, including electronic copiers.

Imaging systems (e.g., printers or copiers) typically include copy sheet paper paths through which copy sheets (e.g., plain paper) which are to receive an image are conveyed and imaged. The process of inserting copy sheets into the copy sheet paper path and controlling the movement of the copy sheets through the paper path to receive an image on one or both sides, is referred to as "scheduling". Copy sheets are printed by being passed through a copy sheet paper path (which includes a marking station) one or multiple times. Copy sheets which are printed on only one side (simplex copy sheets) in a single color usually pass through the copy sheet paper path a single time. Multipass printing is used to print images on both sides of a copy sheet (duplex printing), or to print a simplex sheet in multiple colors (one pass for each color). There are two general modes in which copy sheets to be multipass printed can be scheduled: "burst mode" and "interleave mode".

When scheduling in "burst mode", copy sheets are inserted into, imaged, and output from the copy sheet paper path without any "skipped pitches" existing between each consecutive copy sheet. A "pitch" is the portion (or length) of the copy sheet paper path in the process direction which is occupied by a copy sheet as it moves through the copy sheet paper path. A "skipped pitch" occurs when there is a space between two consecutively output copy sheets which is long enough to hold another copy sheet. Accordingly, when scheduling in "burst mode", copy sheets are output from the copy sheet paper path (and, thus, the imaging system) at a maximum rate because no skipped pitches exist between each consecutively output copy sheet.

Various methods for scheduling copy sheets in "burst mode" are disclosed in, for example, the above incorporated U.S. Pat. application No. 07/590,236.

When scheduling copy sheets in "interleave mode", skipped pitches are provided between each consecutively scheduled copy sheet. That is, a space is provided between each copy sheet inserted into and output from the copy sheet paper path. While other copy sheets eventually may be inserted in the space between two consecutively input copy sheets, these other copy sheets are inserted at a later time (described below) and are thus "interleaved" with the previously input copy sheets.

This "interleave mode" of copy sheet scheduling is typically employed in imaging systems which are capable of duplex printing (forming images on both sides of a copy sheet). Many imaging systems which are capable of duplex printing include copy sheet paper paths in the shape of a loop. The scheduling process involves: a) inserting a copy sheet into the loop; b) forming an image on a first side of the copy sheet at an imaging station; c) inverting the copy sheet (so that a second side of the copy sheet will face the imaging station when the copy sheet is reconveyed past the imaging station); d) forming an image on the second side of the copy sheet at the imaging station; and e) outputting the copy sheet from the paper path loop toward a final destination (a tray, a bindexer, finishing devices, etc.).

One reason why the "interleave mode" of scheduling is frequently used when duplex printing relates to the manner in which the original images are provided to the imaging station. For example, when the imaging system is using a recirculating document handler (RDH) to cycle a simplex document over a platen for exposure to a light source for forming duplex copies of the document, the imaging system exposes every other sheet in the simplex document so that a duplex copy of the document can be formed. For example, all even numbered pages in the document are exposed first to form a copy set consisting of copy sheets having even numbered pages on one side. Then, the odd numbered pages in the document are exposed, and these odd numbered pages are formed on the second side of the copy sheets containing the even numbered pages on side one.

The Xerox Corporation "9700" printer, duplex version, is an example of a printer having a long duplex paper path loop and which schedules copy sheets in the interleave mode of operation. It operates in essentially a trayless mode, with a long duplex loop path. Initially, prints (copies) of only the even sides are made, with one skip cycle (skipped pitch) between each print until the entire paper path is filled with even side prints alternated with skipped pitches. When the first completed even side (page 2) reaches the transfer area for the second side print (page 1), that page is printed on the back side. The next print to be made, however, is the next even side in the sequence printed on a blank sheet, and interleaved in the blank spaces (previously skipped pitches) left between sheets on the first pass. Thus, the job then proceeds at full productivity, intermixing (or interleaving) even sides printed on blank sheets for the first pass with odd sides printed on the back of previously completed even sides on their second pass. After the last even side is printed, the system resumes the skip pitch operation until the odd sides are printed on the last of the even side prints.

For a 30 page job, this "9700" printer duplex version page copying sequence can be represented as shown below. [Each "S" represents a skipped pitch. Previously printed sheet pages making their second pass for their second side copy are shown under the slash.]

First stage—[evens copied+skips=half productivity]:

2, S, 4, S, 6, S, 8;

Second stage—[odds and evens intermixed—full productivity]:

1/2, 10, 3/4, 12, 5/6, 14, 7/8, 16, 9/10, 18, 11/12, 20, 13/14, 22, 15/16, 24, 17/18, 26, 19/20, 28, 21/22, 30;

Third stage—[odds copied+skips=half productivity];

23/24, S, 25/26, S, 27/28, S, 29/30.

Note that with this "9700" printer sequence, 36 machine pitches are required to make 30 prints. So, for this 30 page job, the overall duplex operation is only 83% efficient. For longer jobs, the effective efficiency improves. But for shorter jobs the overall efficiency degrades, since there will still be 6 skipped pitches—"S".

The sequence used on Xerox Corporation "5700" printer is somewhat similar, except that it is not a trayless duplex loop system. All the completed first side sheets are stacked into a duplex buffer tray and later refed for side two printing. With this system, printer skipped pitches are not required during the first stage of the job. The skipped pitches are also not required for the third stage since the completed side ones can be fed at full thruput from the duplex tray. Thus, the "5700" duplexing is much more efficient than in the "9700". However, such duplex tray systems are inherently less reliable in some respects. The required duplex tray stacking, reseparating, and refeeding is implicated in the vast majority of duplex paper jams, and complicates job recovery. That is eliminated with the "9700" and other endless moving path duplex buffer loop systems.

Other conventional sequences for printers are also possible. For example, the Hewlett Packard HP "2000" uses a stack and re-feed method of duplex in which all even sides of the entire job are printed, followed by printing all of the odd sides. However, for this, the entire job (all the page images) must be stored in memory in order to insure jam recovery.

It is generally known that electronically inputted printers can desirably provide more flexibility in page sequencing (page, copying presentation order) than copiers with physical document sheet input. The printer input is electronically manipulatable electronic page media, rather than physical sheets of paper which are much more difficult to reorder or manipulate into a desired sequence. As also shown in the art noted hereinbelow, it is generally known that certain such reordered or hybrid document page copying orders or sequences may be copied onto a corresponding sequential train of copy sheets in an appropriate copier or printer to provide higher copying machine productivity yet correct page order copy output, especially for duplex copies made with a copier with trayless duplexing, i.e., providing a limited length endless buffer loop duplexing path for the copy sheets being duplexed.

Thus, electronically inputted imaging systems can operate in "burst mode" even when forming duplex copy sets. When operating in burst mode in an electronically inputted imaging system having an endless buffer loop duplexing paper path (no buffer tray), the duplexing paper path is completely filled with copy sheets (no skipped pitches) which are then imaged on both sides before being output from the duplexing paper path. Duplex burst mode scheduling causes duplex sheets to be output in small bursts of sheets (the duplex loop content) at full rated output.

When printing multiple sets of copy sheets which contain at least some duplex printed copy sheets in burst mode or interleave mode, in certain situations, it is possible to intermix the copy sheets from different sets or jobs as long as the order in which the sets are output from the duplex paper path (and the final destinations of each set) does not result in the output printed sets being intermixed. A number of scheduling algorithms for increasing printer productivity by intermixing copy sheets are disclosed in the above incorporated U.S. Pat. application Ser. No. 07/590,236. These algorithms operate locally in that they determine whether to insert a copy sheet from a supply bin into the duplex paper path based upon information that is available when the copy sheet is to be inserted into the duplex paper path. Although the algorithms disclosed in U.S. Pat. No. 07/590,236 are used to schedule copy sheets in burst mode, there are situations, described, for example, in the above incorporated U.S. Pat. application No. 07/752,108 (Attorney Docket No. JAO 26716), where it is desirable to schedule copy sheets in interleave mode. The same algorithms can be used to schedule copy sheets in interleave mode as in burst mode, with one additional constraint on pitch availability at the point of copy sheet insertion: a pitch of the duplex path is unavailable (to receive a new sheet from the supply bin) if a side one or a simplex sheet was scheduled in the preceding pitch.

The present invention is applicable to burst mode or interleave mode scheduling, performed as described above, or using other logic which results in similar copy sheet output (no skipped pitches between consecutively output copy sheets or a skipped pitch between at least some of the consecutively output copy sheets).

It is becoming increasingly common to integrate on-line finishing devices with imaging systems. These on-line finishing devices directly receive copy sheets as they are output from the imaging system and perform various types of finishing operations on each copy sheet, or on each set of copy sheets. The finishing operations can be, for example: binding, stitching, folding, trimming, aligning, rotating, punching, drilling, slitting, perforating, and combinations thereof.

Problems can arise when integrating an existing finishing device with a high speed imaging system. For example, the finishing device may not be able to immediately receive copy sheets output by the imaging system from a subsequent set (a second set) when it is performing its finishing operation(s) on the preceding set (a first set).

Typically, an appropriate number of skipped pitches are scheduled between the last copy sheet in the first set and the first copy sheet in the next (second) set so that a sufficient amount of time exists for the finishing device to perform its finishing operation on the first set before the first printed copy sheet from the second set reaches the finishing device. The appropriate number of skipped pitches is referred to as the "interset interval". The length of the interset interval (in pitches) can vary depending on the pitch mode (or more precisely, the sheet delivery interval) and the number of copy sheets in each set of copy sheets. When the finishing task is distributed among multiple operations and/or modules, the interset interval must be sufficient to prevent a subsequent set from overtaking the current set in each module.

Table 1 illustrates some examples of scheduling which includes providing interset intervals between the output of each set of copy sheets. In these examples, the duplex paper path loop length is 8 pitches, each set is 6 sheets long, and the interset interval is 3 pitches. The interset interval scheduling operated as follows:

A) if the first set is simplex, insert the interset interval (3) skipped pitches after the pitch containing the last side one image of the first set;

B) if the first set is duplex, insert the interset interval (3) skipped pitches after the pitch reserved for the side two image of the last sheet in the first set if the next set is simplex, otherwise, if the next set is duplex, insert the interset interval (3) skipped pitches after the pitch containing the side one image of the last sheet in the first set.

Accordingly, there is a need for an imaging system which optimizes copy sheet output productivity while providing an appropriate interset interval between output sets of printed copy sheets that are destined for on-line finishing devices used therewith.

U.S. Pat. No. 4,918,490 to Denis J. Stemmle (Xerox Corporation) discloses an endless duplex paper path loop having a single sheet inverter for inverting sheets in the duplex loop after side one imaging. Sheets are consecutively inserted into the duplex loop to avoid the first and third stage skipped pitches discussed above with reference to the "9700" system. Sheets are scheduled in 1-N order, with each multipage job set being electronically divided into consecutive batches, each batch containing a small number of pages equal to approximately twice the copy sheet length.

Also of interest is Mead Corporation U.S. Pat. No. 4,453,841 issued Jun. 12, 1984 to Bobick et al disclosing a trayless duplexing buffer loop path printer system, and noting particularly the page copying sequences shown in FIG. 6.

Some examples of other prior art printers, and especially with control systems therefor, including operator console switch selection inputs, document sheet detecting switches, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270; and

TABLE 1

| Pitch | A<br>Simplex to<br>Simplex | B<br>Simplex to<br>Duplex | C<br>Duplex to<br>Simplex | D<br>Duplex to<br>Duplex |
|---|---|---|---|---|
| 1 | set 1, sheet 1 | set 1, sheet 1 | set 1, side 1, sheet 1 | set 1, side 1, sheet 1 |
| 2 | set 1, sheet 2 | set 1, sheet 2 | set 1, side 1, sheet 2 | set 1, side 1, sheet 2 |
| 3 | set 1, sheet 3 | set 1, sheet 3 | set 1, side 1, sheet 3 | set 1, side 1, sheet 3 |
| 4 | set 1, sheet 4 | set 1, sheet 4 | set 1, side 1, sheet 4 | set 1, side 1, sheet 4 |
| 5 | set 1, sheet 5 | set 1, sheet 5 | set 1, side 1, sheet 5 | set 1, side 1, sheet 5 |
| 6 | set 1, sheet 6 | set 1, sheet 6 | set 1, side 1, sheet 6 | set 1, side 1, sheet 6 |
| 7 | skip | skip | | skip |
| 8 | skip | skip | | skip |
| 9 | skip | skip | set 1, side 2, sheet 1 | set 1, side 2, sheet 1 |
| 10 | set 2, sheet 1 | set 2, side 1, sheet 1 | set 1, side 2, sheet 2 | set 1, side 2, sheet 2 |
| 11 | set 2, sheet 2 | set 2, side 1, sheet 2 | set 1, side 2, sheet 3 | set 1, side 2, sheet 3 |
| 12 | set 2, sheet 3 | set 2, side 1, sheet 3 | set 1, side 2, sheet 4 | set 1, side 2, sheet 4 |
| 13 | set 2, sheet 4 | set 2, side 1, sheet 4 | set 1, side 2, sheet 5 | set 1, side 2, sheet 5 |
| 14 | set 2, sheet 5 | set 2, side 1, sheet 5 | set 1, side 2, sheet 6 | set 1, side 2, sheet 6 |
| 15 | set 2, sheet 6 | set 2, side 1, sheet 6 | skip | skip |
| 16 | skip | | skip | set 2, side 1, sheet 1 |
| 17 | skip | | skip | set 2, side 1, sheet 2 |
| 18 | skip | set 2, side 2, sheet 1 | set 2, sheet 1 | set 2, side 1, sheet 3 |
| 19 | set 3, sheet 1 | set 2, side 2, sheet 2 | set 2, sheet 2 | set 2, side 1, sheet 4 |
| 20 | set 3, sheet 2 | set 2, side 2, sheet 3 | set 2, sheet 3 | set 2, side 1, sheet 5 |
| 21 | set 3, sheet 3 | set 2, side 2, sheet 4 | set 2, sheet 4 | set 2, side 1, sheet 6 |
| 22 | set 3, sheet 4 | set 2, side 2, sheet 5 | set 2, sheet 5 | |
| 23 | set 3, sheet 5 | set 2, side 2, sheet 6 | set 2, sheet 6 | |
| 24 | set 3, sheet 6 | | | set 2, side 2, sheet 1 |

The skipped pitches which are inserted to provide the 3 pitch interset interval are labelled "skip". Unlabeled pitches (column B, pitches 16 and 17; column C, pitches 7 and 8; oolumn D, pitches 22 and 23) are gaps which naturally occur due to duplex scheduling and the feature of buffer-trayless duplex paper paths that each copy sheet remains in the same pitch of the paper path for receiving its side two image. Also note that pitches 7 and 8 in column D, are counted as skipped pitches for the interset interval, and also occur naturally as a result of duplex scheduling.

It is not desirable to schedule skipped pitches if they are not necessary because they cause a decrease in productivity.

4,475,156. It is well known in this art, and in general, how to program and execute document handler and printer control functions and logic with conventional or simple software instructions for conventional microprocessors in a printer controller. This is taught by the above and other patents and various commercial copiers/printers. Such software may vary depending on the particular function and particular microprocessor or microcomputer system utilized, of course, but will be available to or readily programmable by those skilled in the applicable arts without undue experimentation, from either descriptions or prior knowledge of the desired functions together with general knowledge in the general software and computer arts. It is also known that conventional or specified document and copy sheet handling functions and controls may be alternatively conventionally provided utilizing various other known or suitable logic or switching systems.

All references cited in this specification, and their references, are incorporated by reference herein where appropriate for appropriate teachings of additional or alternative details, features and/or technical background.

OBJECTS AND SUMMARY OF THE INVENTION

It is an object of the present invention to provide methods of scheduling copy sheets for being printed in a duplex printer, wherein when at least some of the copy sheets are to be duplex printed, a minimum number of skipped pitches are scheduled between each set of printed copy sheets while still maintaining an appropriate interset interval between each set of output copy sheets so as to prevent the subsequent set from overtaking the current set at any stage in the finishing operation.

To achieve the foregoing and other objects, and to overcome the shortcomings discussed above, gaps which naturally exist in the output of printed copy sheets from a duplex paper path due to duplex printing are selectively combined with interset interval skipped pitches so as to provide an appropriate interset interval between each set of printed copy sheets while minimizing the number of skipped pitches which actually need to be scheduled. When a first of two adjacent sets of copy sheets is simplex and the second one of two adjacent sets of copy sheets includes at least some copy sheets to be duplex printed, each side one image of the first contiguous group of copy sheets in the second set, starting with the first duplex copy sheet in the second set, is counted as a skipped pitch. Similarly, when a duplex copy path includes a buffer tray and the second one of two adjacent sets of copy sheets includes at least one copy sheet to be duplex printed (regardless of the ,plex of the first set), each side one image of the first contiguous group of copy sheets in the second set, starting with the first duplex copy sheet in the second set, is counted as a skipped pitch. When at least some of the copy sheets in each of first and second adjacent sets of copy sheets are to be duplex printed in a buffer trayless duplex paper path loop, the appropriate number of skipped pitches are provided after a pitch scheduled to receive the side one image of the last sheet in the first set, wherein each pitch reserved for receiving a side two image encountered when inserting the skipped pitches is counted as a skipped pitch. Accordingly, when scheduling the interset interval between the two adjacent copy sets, less (possibly zero) skipped pitches need to be scheduled (inserted) into the duplex paper path.

The present invention is applicable to duplex printers with or without buffer trays.

BRIEF DESCRIPTION OF THE DRAWINGS

The invention will be described in detail with reference to the following drawings in which like reference numerals refer to like elements and wherein:

FIG. 12 is a flowchart of the scheduling algorithm according to the present invention as applied to the printing system of FIGS. 1, 3 and 8 combined with the SBM of FIG. 9.

DETAILED DESCRIPTION OF THE PREFERRED EMBODIMENTS

A. The System

Figure 1:
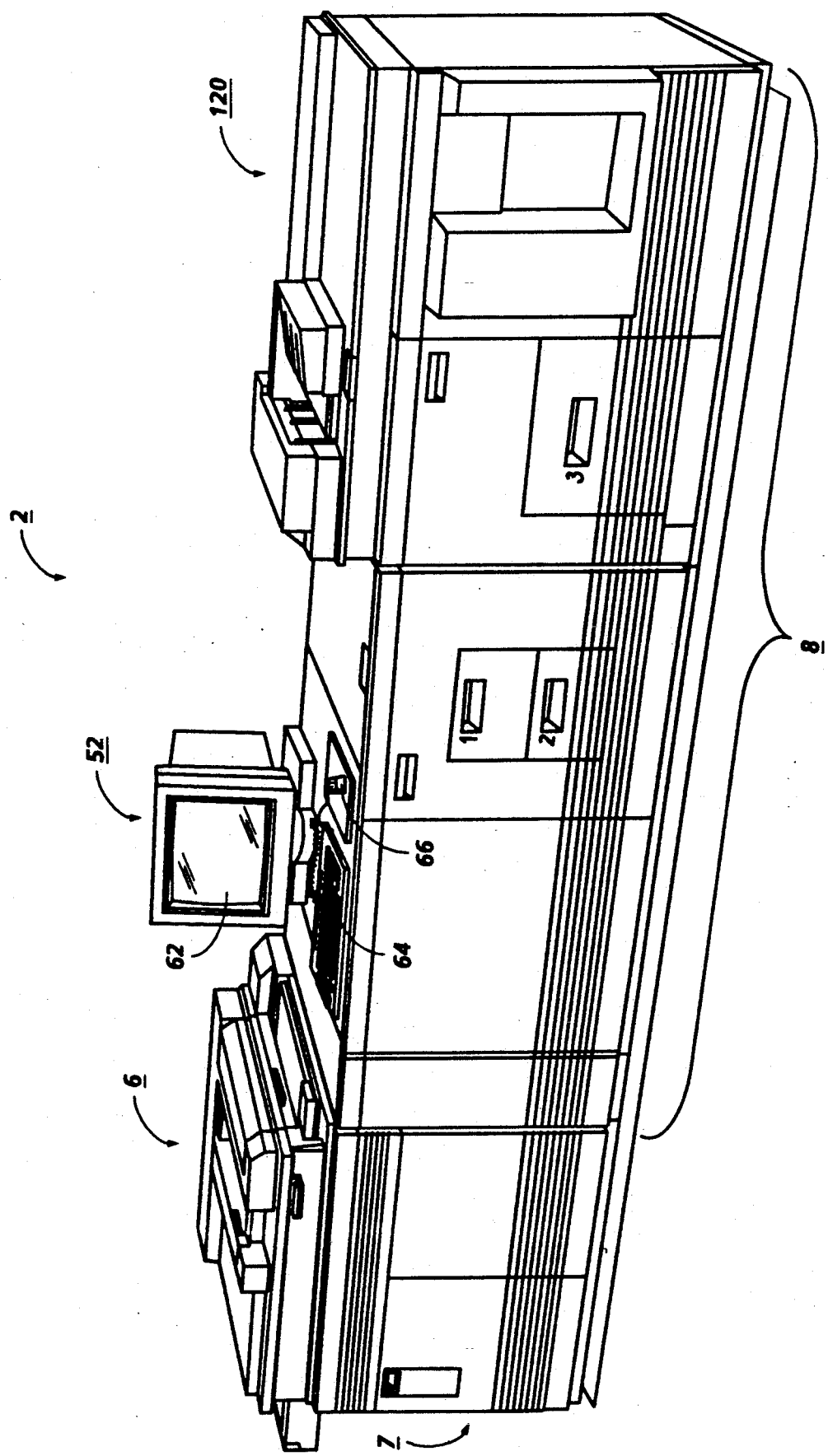
FIG. 1 is a view depicting an electronic printing system.
Figure 2:
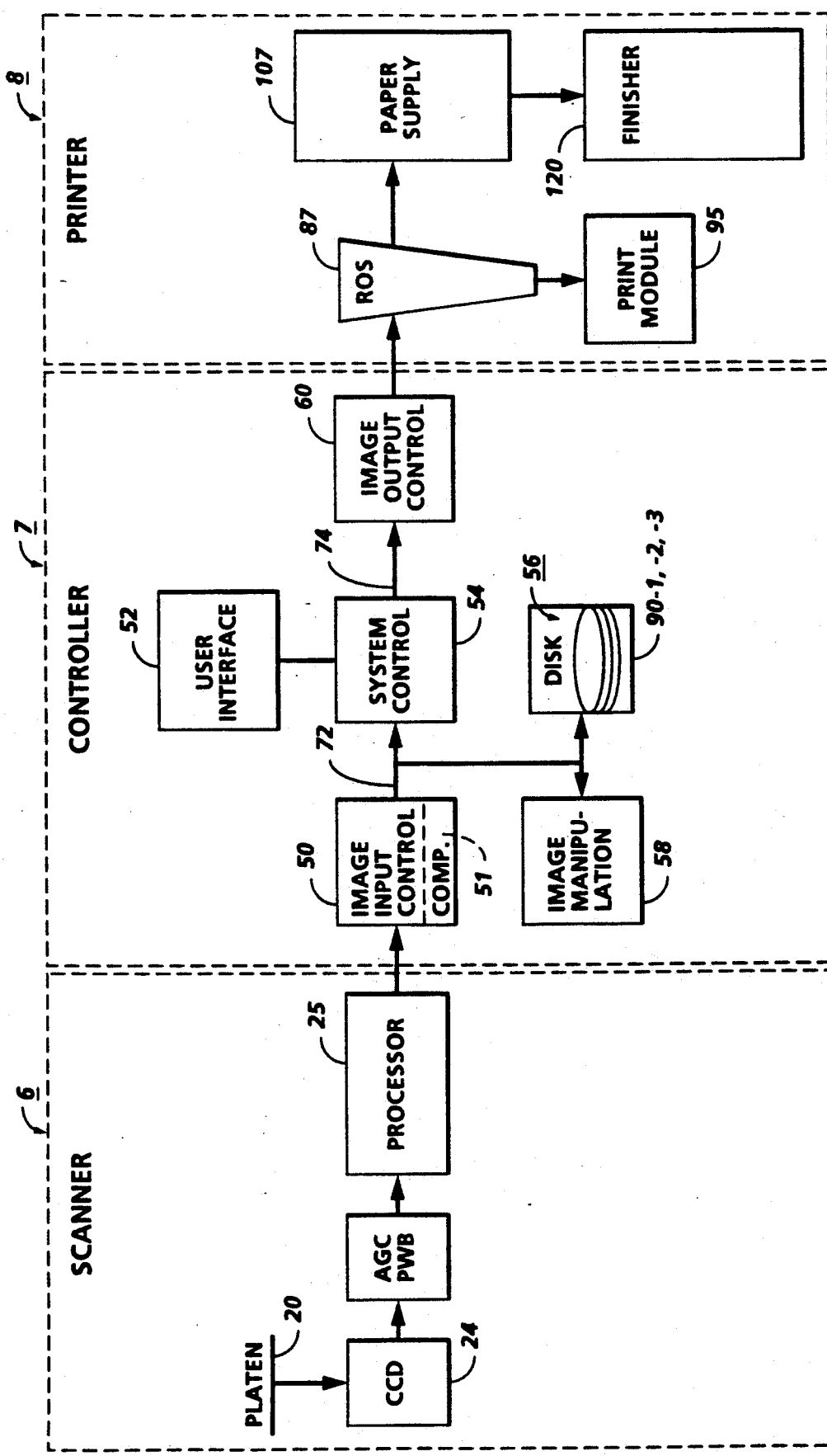
FIG. 2 is a block diagram depicting the major elements of the printing system shown in FIG. 1.

Referring to FIGS. 1 and 2, there is shown an exemplary laser based printing system (or imaging device) 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

Figure 3:
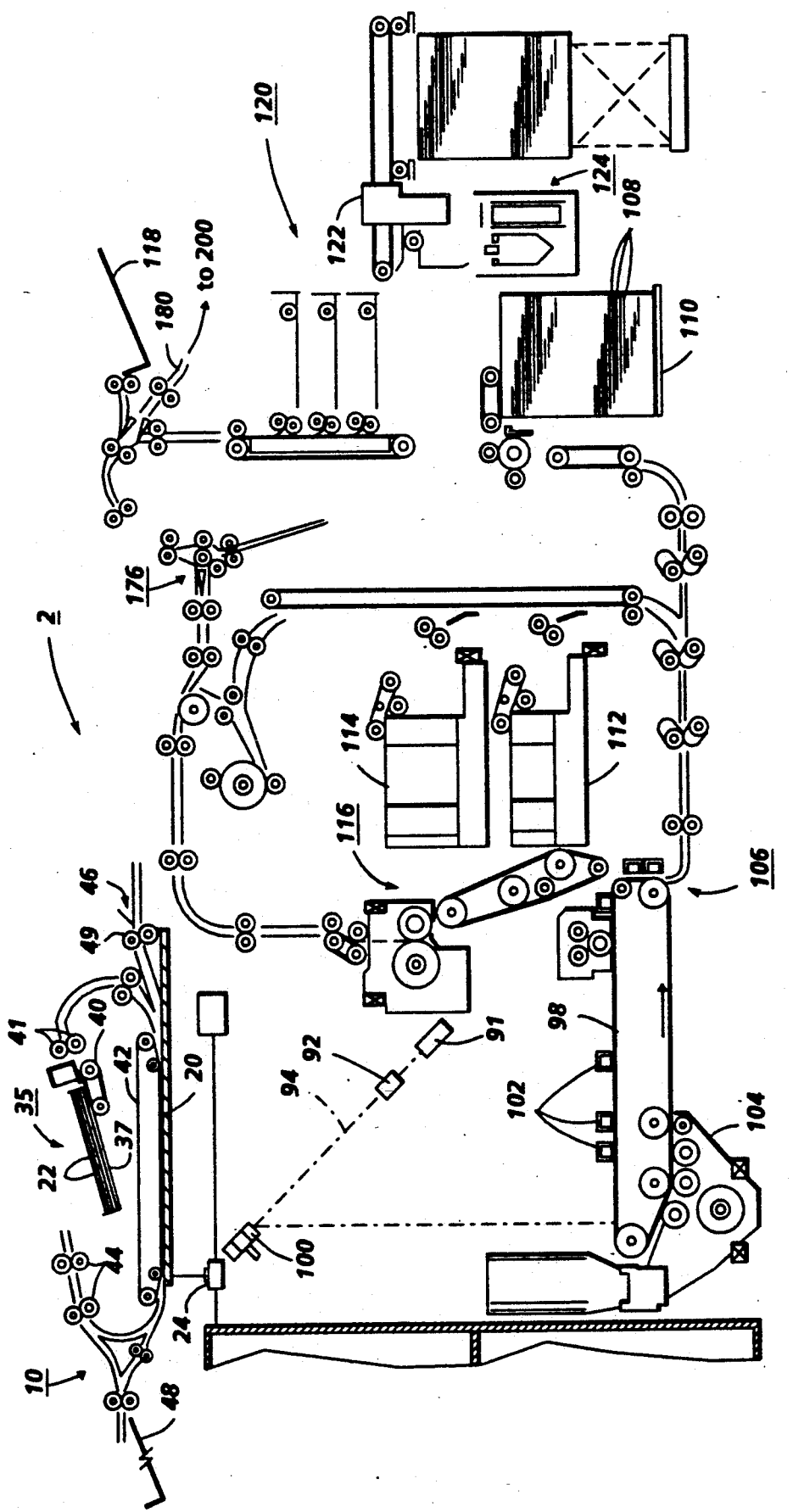
FIG. 3 is a plan view illustrating the principal mechanical components of the printing system shown in FIG. 1.
Figure 4:
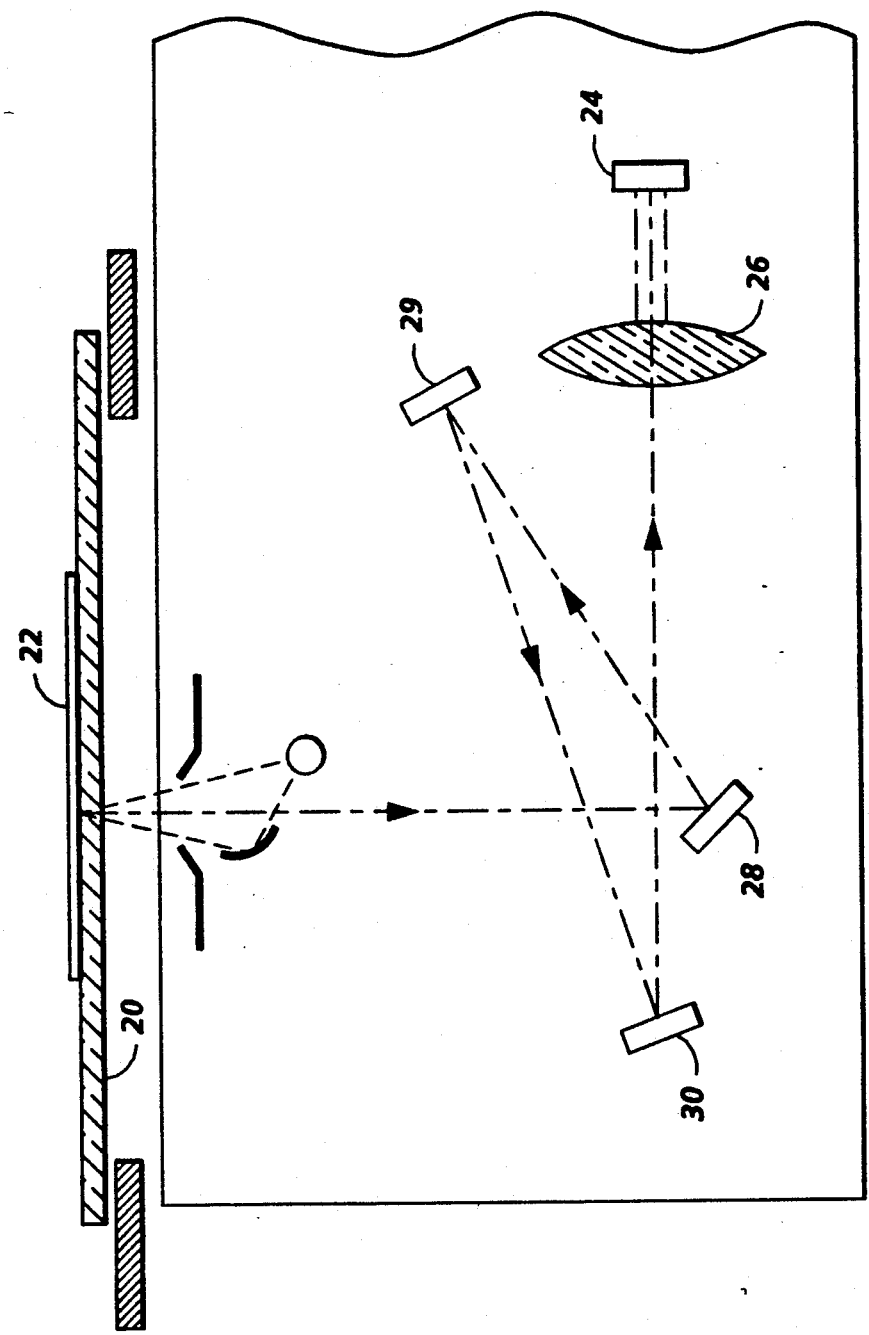
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line like segment of platen 20 and the document being scanned thereon. Array 24 provides image signals or pixels representative of the image scanned which, after suitable processing by processor 25, are output to controller section 7.

Processor 25 converts the analog image signals output by array 24 to digital image signals and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 42 onto platen 20 where the document is scanned by array 24. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply Section 107, and High Speed Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, Or 114. The developed image transferred to the print media 108 is permanently fixed or fused by fuser 116 and the resulting prints discharged to either output tray 118, to high speed finisher 120, or through bypass 180 to some other downstream finishing device, which could be a low speed finishing device such as an SBM 200. High speed finisher 120 includes a stitcher 122 for stitching or stapling the prints together to form books and thermal binder 124 for adhesively binding the prints into books.

Referring to FIGS. 2 and 5, controller section 7 is, for explanation purposes, divided into an image input controller 50, User Interface(UI) 52, system controller 54, main memory 56, image manipulation section 58, and image output controller 60.

The scanned image data input from processor 25 of scanner section 6 to controller section 7 is compressed by image compressor/processor 51 of image output input controller 50 on PWB 70-3. As the image data passes through compressor/processor 51, it is segmented into slices N scanlines wide, each slioe havinq a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point a cursor to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Figure 5A:
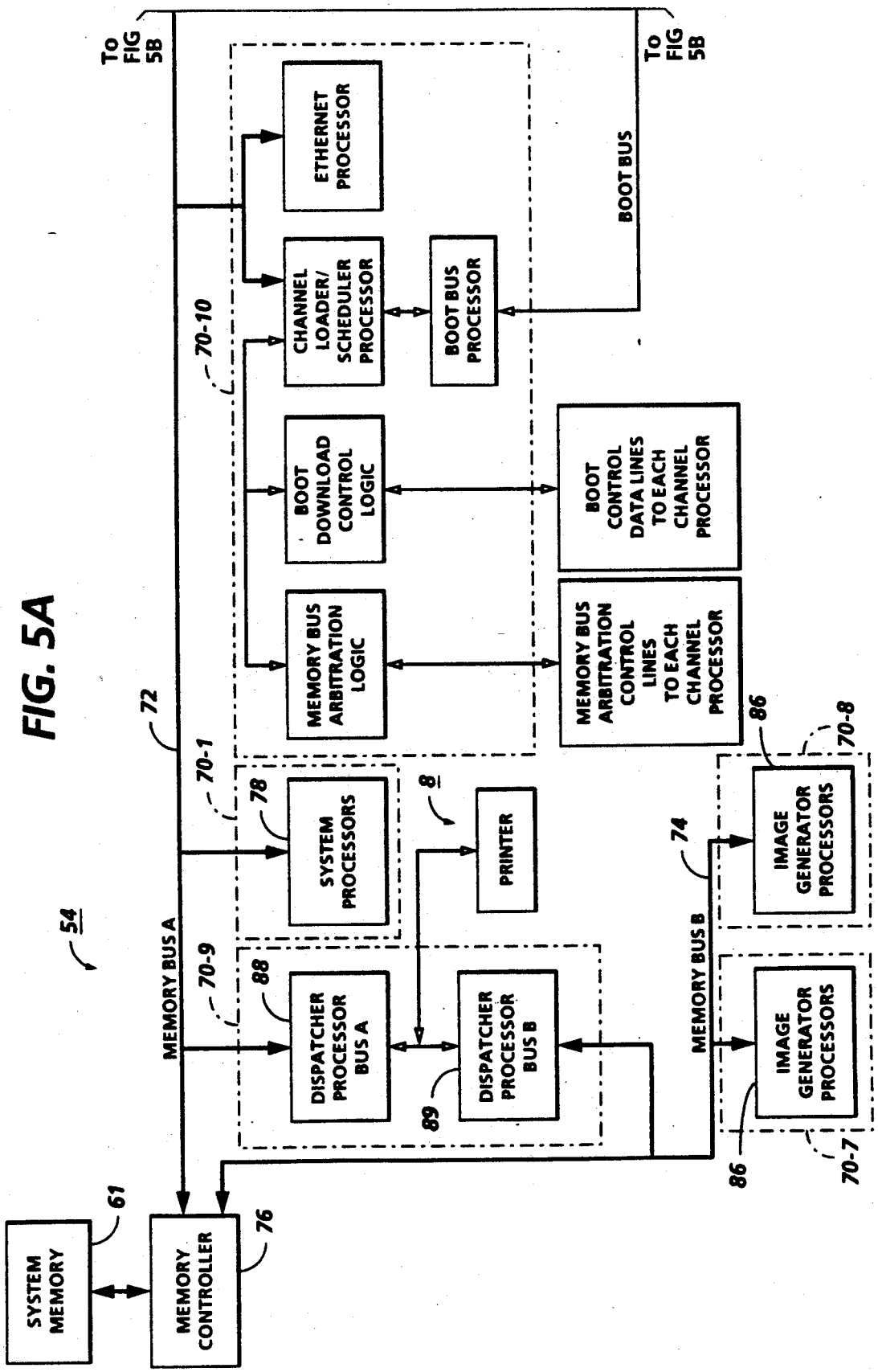
FIGS. 5A-5C comprise a schematic block diagram showing the major parts of the control section for the printing system shown in FIG. 1.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 5B:
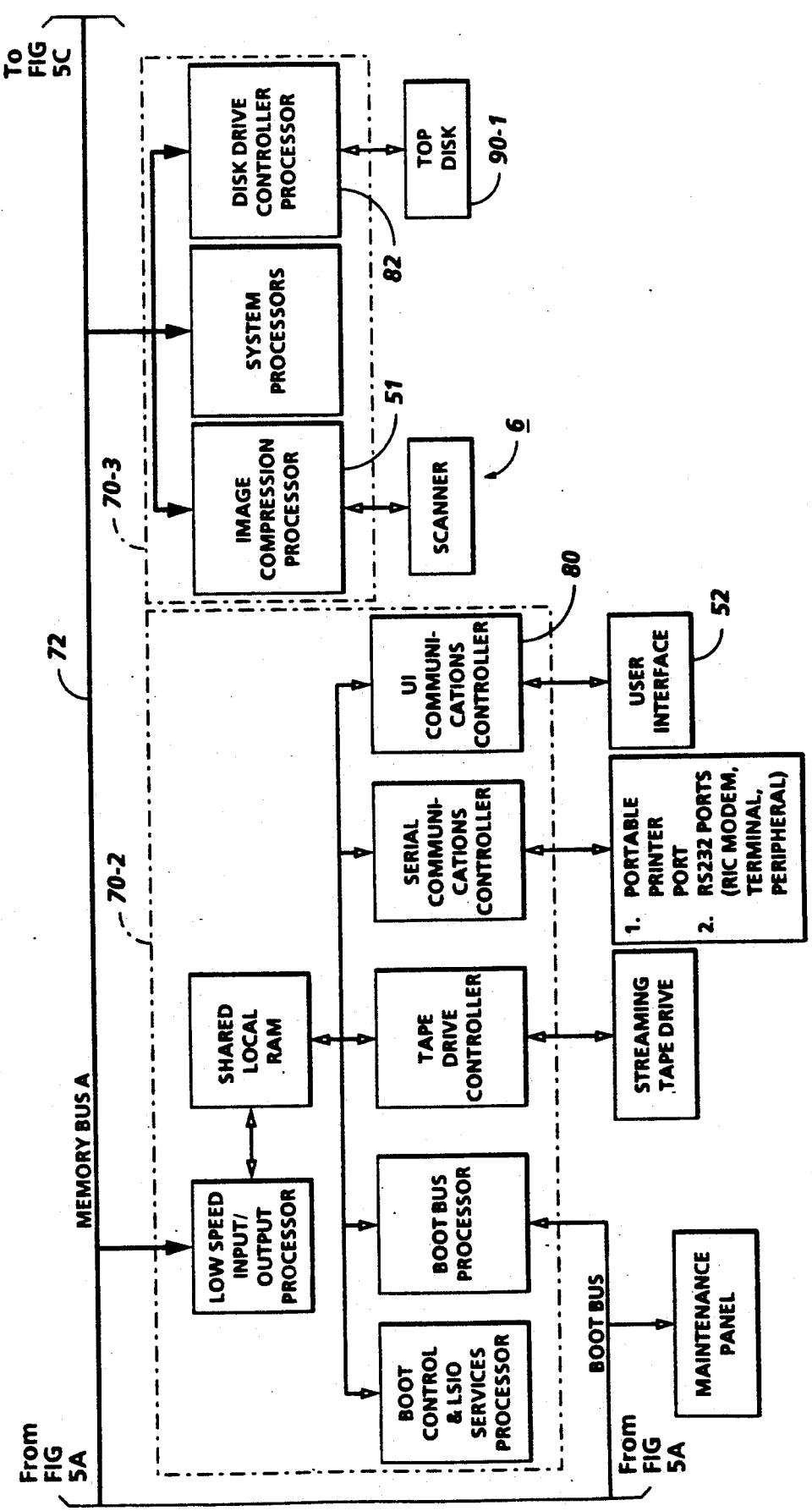
Figure 5C:
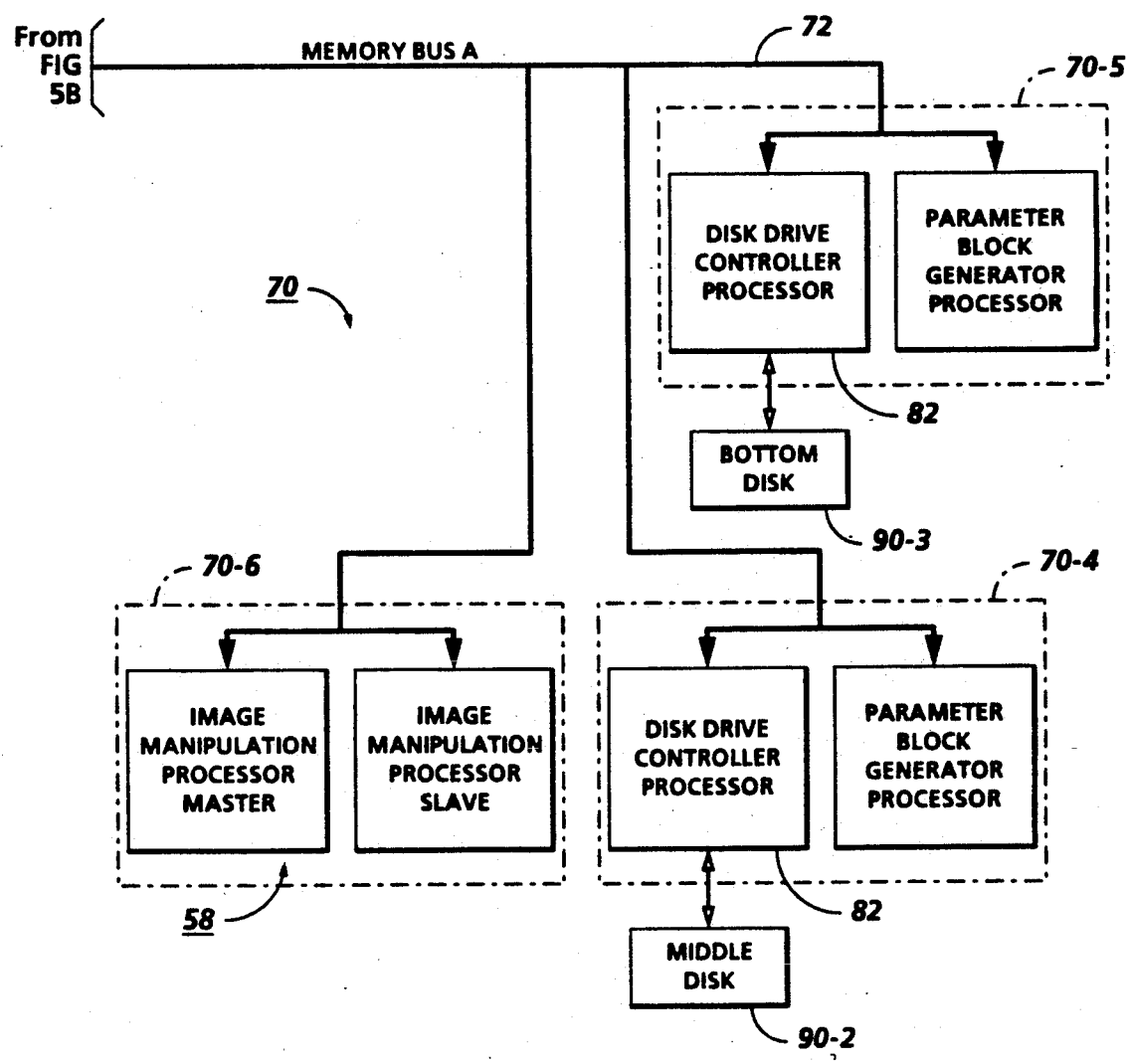

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs include system processor PWB 70-1 having plural system processors 78; low speed I/0 processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printing section 8; dispatch processor PWB 70-9 having dispatch processors 88, 89 for controlling transmission of data to and from printer section 8; and boot control-arbitration-scheduler PWB 70-10.

Figure 6:
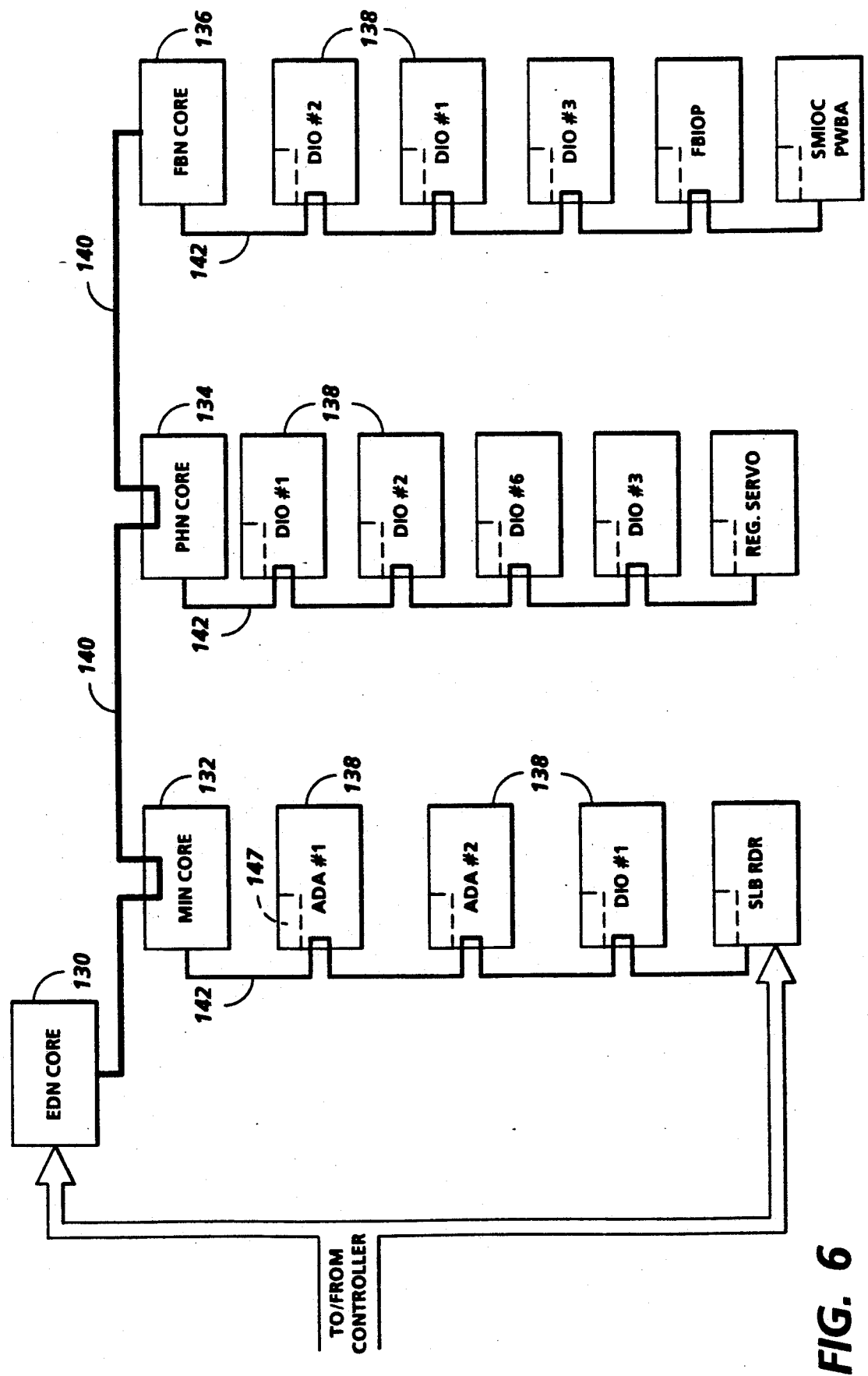
FIG. 6 is a block diagram of the Operating System, together with Printed Wiring Boards and shared line connections for the printing system shown in FIG. 1.

Referring particularly to FIG. 6, system control signals are distributed via a plurality of printed wiring boards (PWBs). These include EDN (electronic data node) core pWB 130, Marking Imaging core PWB 132, Paper Handling core PWB 134, and Finisher Binder core PWB 136 together with various Input/Output (I/0) PWBs 138. A system bus 140 couples the core pWBs 130, 132, 134, 136 with each other and with controller section 7 while local buses 142 serve to couple the I/0 PWBs 138 with each other and with their associated core PWB.

A Stepper Motor Input Output Controller (SMIOC) Printed Wiring Board Assembly (PWBA) is included when the printing system is used with an SBM. The SMIOC PWBA controls the operation of a sheet rotator which may be required when using the SBM. The SMIOC PWBA also handles the exporting of control signals from the printer to the SBM and monitors the status lines from the SBM. The SBM has two status lines whose status is either high or low. The status lines respectively indicate whether the SBM is ready and whether the SBM (output stacking tray) is full.

On machine power up, the Operating System software is loaded from memory 56 to EDN core PWB 130 and from there to remaining core PWBs 132, 134, 136 via bus 140, each core PWB 130, 132, 134, 136 having a boot ROM 147 for controlling downloading of Operating System software to PWB, fault detection, etc. Boot ROMs 147 also enable transmission of Operating System software and control data to and from PWBs 130, 132, 134, 136 via bus 140 and control data to and from I/0 PWBs 138 via local buses 142. Additional ROM, RAM, and NVM memory types are resident at various locations within system 2.

Figure 7:
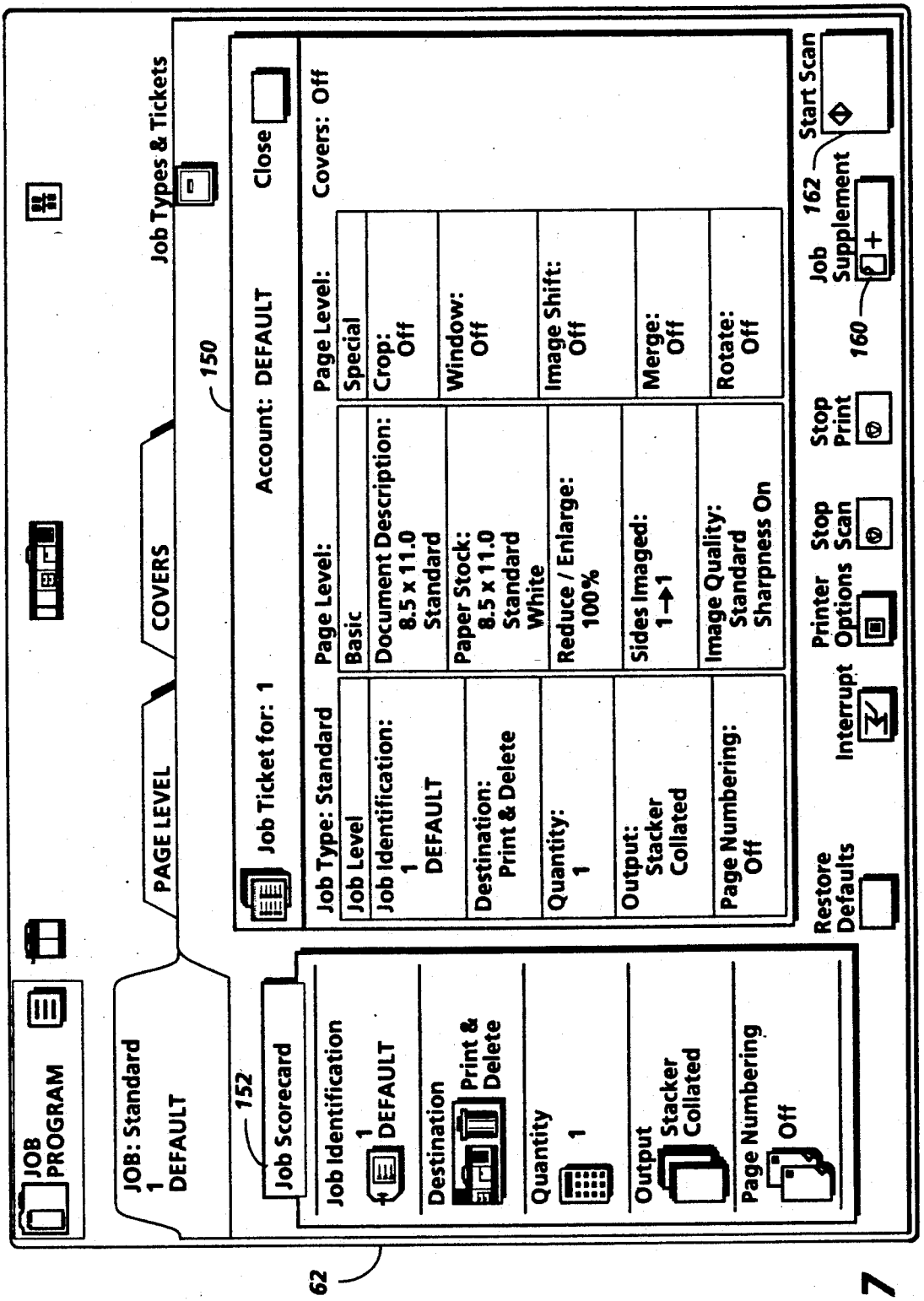
FIG. 7 is a view depicting an exemplary job programming ticket and job scorecard displayed on the User Interface(UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

B. The Duplex Paper Path Endless Loop

Figure 8:
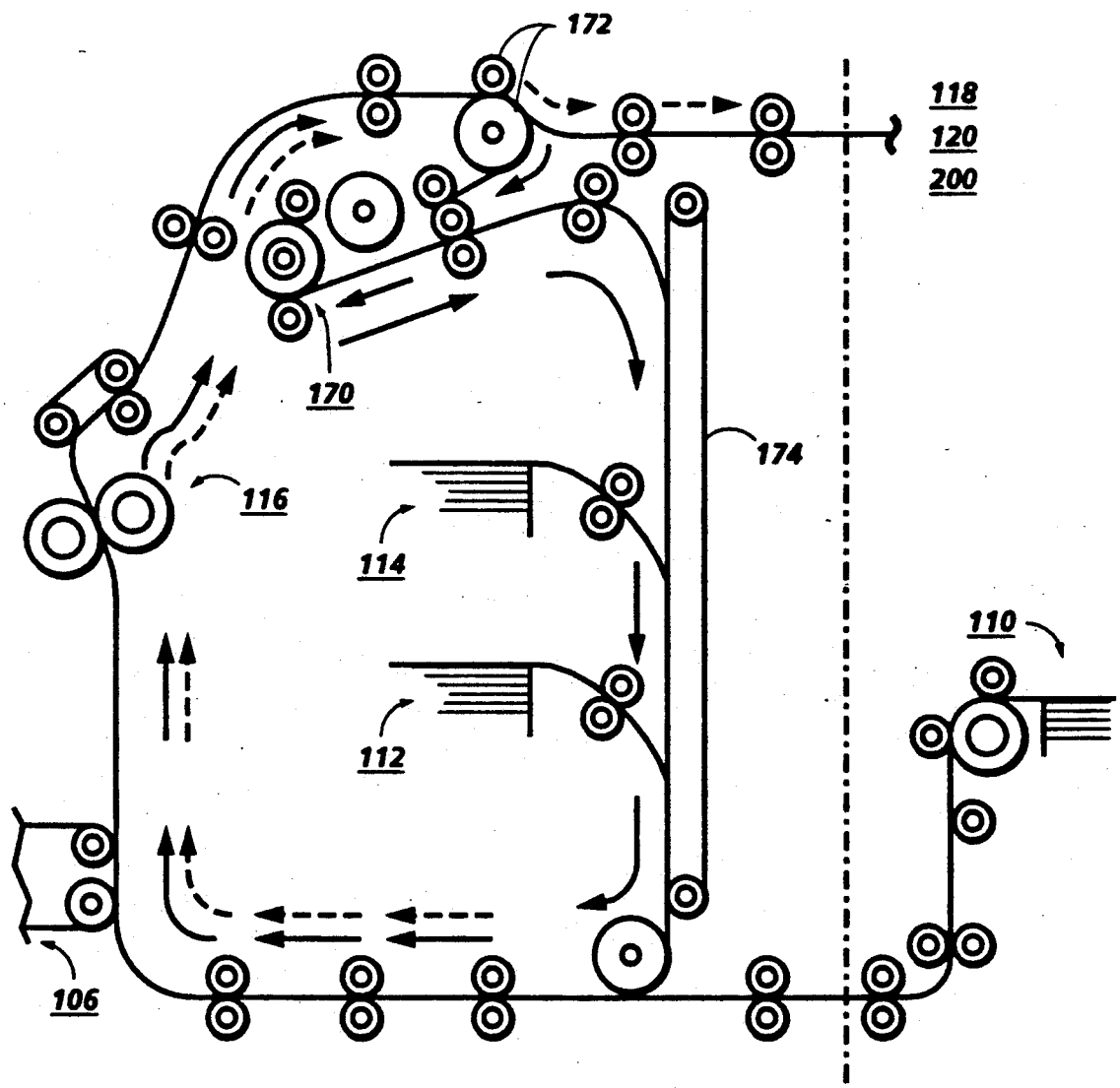
FIG. 8 is a plan view illustrating the duplex and simplex paper paths through which sheets are conveyed through the system of FIG. 3.

FIG. 8 is a plan view illustrating the duplex and simplex paper paths through which sheets are conveyed in the system of FIG. 3. In FIG. 8, the path through which a sheet travels during duplex imaging is illustrated by the arrowed solid lines, whereas the path through which a sheet to be simplex imaged travels is illustrated by the arrowed broken lines. After an appropriately sized sheet is supplied from one of feed trays 110, 112 or 114, the sheet is conveyed past image transfer station 106 to receive an image. The sheet then passes through fuser 116 where the image is permanently fixed or fused to the sheet. After passing through rollers 172, gates (not shown) either allow the sheet to move directly to a final destination (e.g., tray 118, high speed finisher 120, SBM 200) or deflect the sheet into single sheet inverter 170. If the sheet is either a simplex sheet or a duplex sheet having completed side one and side two images formed thereon, the sheet will be conveyed directly to its final destination. If the sheet is a duplex sheet printed only with a side one image, the gate will deflect the sheet into inverter 170, where the sheet will be inverted and then fed to belt 174 for recirculation past transfer station 106 and fuser 116 for receiving and permanently fixing the side two image to the backside of the sheet. Examples of single sheet inverters usable with the present invention are disclosed in U.S. Pat. Nos. 4,918,490; 4,935,786; 4,934,681; and 4,453,841, the disclosures of which are herein incorporated by reference.

Unlike some previously designed duplex paper feed paths, the illustrated embodiment includes a single sheet inverter and no duplex buffer tray. This single sheet inverter 170 recirculates a side one imaged duplex sheet toward image transfer station 106 immediately after inverting the copy sheet. This differs from duplex systems having buffer trays which accumulate all side one imaged sheets therein prior to recirculation to an imaging station for receiving their side two image. For a given paper path length, the duplex paper path architecture of the illustrated embodiment offers a shorter duplex loop time because there is no sheet settling time nor sheet reacquisition time which is typically required with duplex architectures having a buffer tray therein. The absence of sheet buffering for the illustrated architecture decreases the size of the duplex sheet tracking buffers in the IOT control system and reduces the maximum number of duplex path purge sheets. By eliminating buffering and reacquisition of sheets, this architecture eliminates the job integrity problems associated with delayed detection of duplex tray multifeeds. That is, since systems having duplex buffer trays therein frequently lead to job integrity problems due to more than one sheet being unintentionally fed from the buffer tray at a time, the elimination of the buffer tra eliminates this problem. Additionally, since less sheets exist in the duplex paper path at a time than when a buffer tray is employed, the controller which controls the imaging process need keep track of fewer copy sheets at a time. The single sheet inverter and duplex paper path employed in the illustrated example is capable of handling sheets ranging in width from 8 to 17 inches and ranging in length from 10 to 14.33 inches.

As defined herein, the width of a sheet for purposes of the copy sheet paper path is the length of the edge of that sheet which is parallel to the direction in which copy sheets are fed through the paper path (the process direction). Thus, as will be described below, since smaller sheets such as 8½×11 inch sheets are fed with their long edge (the 11 inch edge) first, their "width" in the paper path is 8½ inches. Since large sheets such as 11×17 inch sheets are fed with their short edge (the 11 inch edge) first, their width in the paper path is 17 inches.

The length (in pitches) of the duplex paper path loop varies according to the size of the copy sheets which are being printed therein. Table 2 illustrates the length (in pitches) of the duplex paper path loop as a function of pitch mode for some conventional sizes of copy sheets which are printed. The duplex paper path loop size is eight pitches long in seven pitch mode and four pitches long in three pitch mode. The length of the duplex paper path is measured from the lead edge of a copy sheet at transfer to the lead edge of the inverted print at transfer. As can be seen, printing system 2 is selectively operable in either a three pitch mode or a seven pitch mode.

TABLE 2

| SHEET SIZE | PITCH MODE | DUPLEX LOOP SIZE |
|---|---|---|
| 8½" × 11" | 7 | 8 |
| A4 | 7 | 8 |
| 11" × 17" | 3 | 4 |
| A3 | 3 | 4 |

Pitch mode is defined as the number of integral images placed on the photoreceptor. Pitch mode is a function of image width which is usually equal to paper width. Fundamentally the duplex loop size in pitches is a function of pitch time, paper width, the duplex loop length and velocities throughout the loop. Given a constant photoreceptor surface speed—necessary for a ROS based imaging system—the frequency of copy sheet deliveries is strictly a function of pitch mode. It is not a function of duplex loop size.

The printing system operates in the seven pitch mode unless large, 11×17 inch copy sheets or A3 size copy sheets are used. More generally, the printing system operates in seven pitch mode (where a length, M, of the duplex paper path loop is 8 pitches) when the width of copy sheets is equal to or less than 9.0 inches, and operates in three pitch mode (where M=4 pitches) when the copy sheet width is greater than 9.0 inches and less than or equal to 17.0 inches. Due to their length, eight 11×17 inch copy sheets cannot be carried in the duplex paper path loop at one time. Accordingly, when using 11×17 inch copy sheets, the printing system operates in the three pitch mode. Although no skipped pitches are inserted between the 11×17 inch copy sheets, their output from the printing system is three-sevenths that of smaller sheets when the printing system is operating in the burst mode. Thus, the pitch mode in which printing system 2 operates affects the number of pitches required to ensure an appropriate interset interval. This is described in more detail below.

The control of all machine functions, including all sheet feeding, is, conventionally, by a machine controller. The controller is preferably a known programmable microprocessor system, as exemplified by extensive prior art, e.g., U.S. Pat. No. 4,475,156 and its references. Plural but interconnecting microprocessors may also be used at different locations. The controller conventionally controls all the machine steps and functions described herein, and others, including the operation of the document feeder, all the document and copy sheet deflectors or gates, the sheet feeder drives, the downstream finishing devices 120, 200, etc. As further taught in the references, the printer controller also conventionally provides for storage and comparison of the counts of the copy sheets, the number of documents recirculated in a document set, the desired number of copy sets and other selections and controls by the operator through the console or other panel of switches connected to the controller, etc. The controller is also programmed for time delays, jam correction, etc. Conventional path sensors or switches may be utilized to help keep track of the position of the documents and the copy sheets and the moving components of the apparatus by connection to the controller. In addition, the controller variably regulates the various positions of the gates depending upon which mode of operation is selected. The EDN Core PWBA 130 performs all sheet scheduling functions.

C. The Signature Booklet Maker

Figure 9:
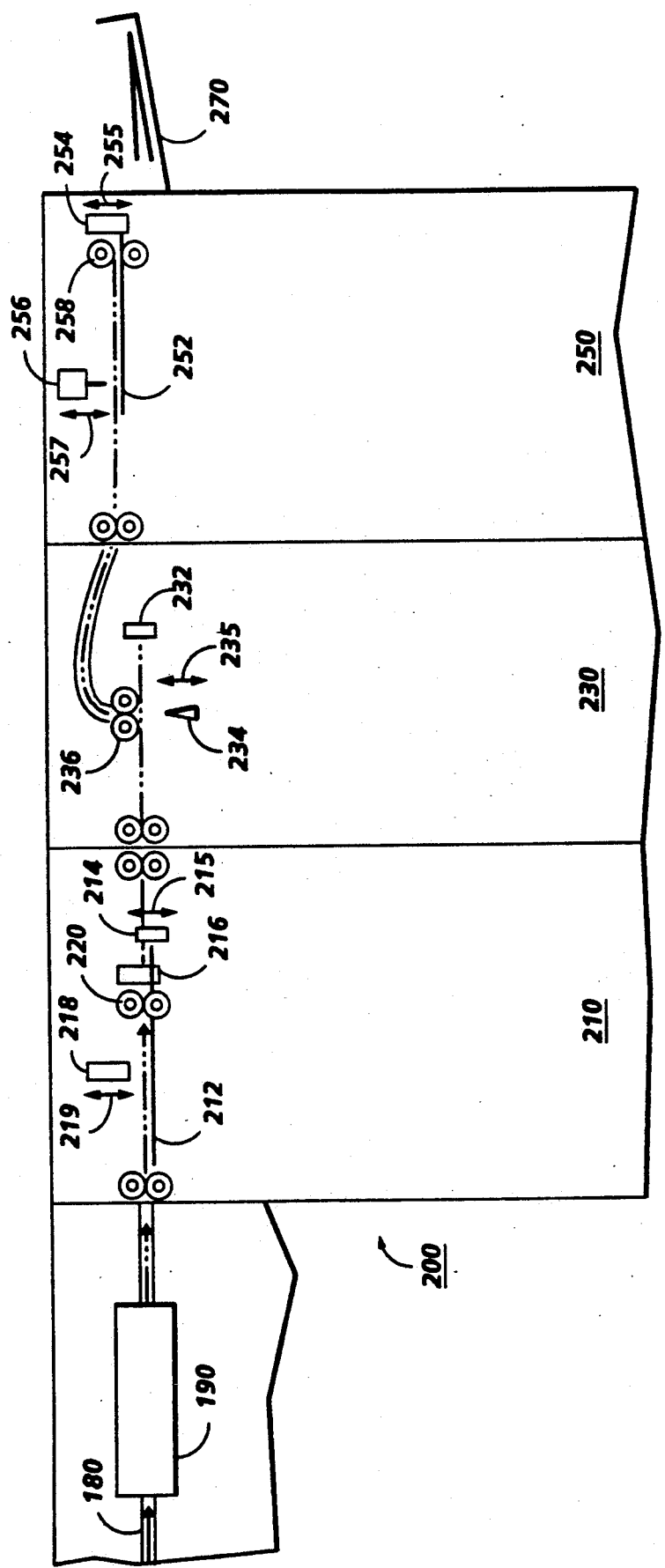
FIG. 9 is a schematic view of an exemplary finishing device such as a Signature Booklet Maker (SBM) for on-line use with the printing system of FIGs. 1, 3 and 8.

FIG. 9 is a schematic view of a Signature Booklet Maker (SBM) 200 for on-line use with the printing system of FIG. 1. A Signature Booklet Maker is one example of a finishing device which can be used with a printing system (or imaging device). A "signature" is a duplex printed copy sheet having two page images on each side. The signature sheet can be folded in half to form a booklet, or a plurality of signatures can be aligned, stitched together and folded in half to form a multi-sheet booklet. A description of signature printing is provided in U.S. Pat. No. 4,727,042 to Smith, the disclosure of which is incorporated herein by reference.

The SBM 200 can be constructed, for example, from variants of three existing finishing modules such as the AGR/Automatic Stitcher, the PA/Automatic Folder, and the TR/Automatic Trimmer, manufactured by C.P. Bourg for off-line use. All modules require mechanical modification to support front edge registration-vs. center registration-and wiring modification to share basic signals with the printer. The printer exports sheet arrival times and end-of-set signals to the SBM equipment. The first module receives and aligns the copy sheets in a set (which set forms a single booklet) so that all sheets in the set are aligned with one another. The first module aligns each sheet by stopping the forward movement of the sheet (e.g., with a gate or sheet stop), and then laterally tapping each sheet against another sheet stop. Once all sheets in the set are received and aligned, the first module stitches or binds all the sheets in the set to each other at a central location (between each page image on each sheet). The stitching step can comprise, for example, stapling. Thus, the first module 210 is referred to as a "saddle stitcher".

The stitched copy set is then forwarded to a second module 230 which folds the stitched copy set in half about the stitch axis. Thus, the second module 230 is referred to as a "folder".

The folded copy set is then forwarded to a third module 250 where the edges of the sheets opposite from the fold are trimmed. Thus, the third module 250 is referred to as a "trimmer". Trimming is necessary, particularly in large sets or booklets, because the edges of the sheets opposite from the fold become uneven due to the folding operation.

When large copy sheets (11×17 inch or A3) are signature printed, they are conveyed through and exit the duplex paper path short edge first, and are fed through bypass 180 and into SBM 200 short edge first. When small copy sheets (8½×11 inch or A4) are signature printed, they are conveyed through and exit the duplex paper path long edge first and are fed through bypass 180. If these smaller sheets are to be folded across their long edge by the SBM, they must be rotated 90° prior to insertion into the SBM. Accordingly, a sheet rotator 190 is provided in the sheet bypass 180 for rotating sheets 90°.

Although a variety of well known rotators can be used, it is preferable to use a sheet rotator employing a single stepper motor which contacts one side of a sheet to selectively decrease the velocity of that side (while a constant velocity roller-operating at the sheet bypass speed-engages and maintains the opposite side of the sheet at a constant velocity) to cause the sheet to rotate. Particularly, the sheet rotator disclosed in U.S. Pat. application No. 07/560,872 to Venkatesh H. Kamath et al, filed Jul. 31, 1990, now U.S. Pat. No. 5,090,683, and entitled "Electronic Sheet Rotator With Deskew, Using Single Variable Speed Roller", the disclosure of which is incorporated herein by reference, can be used. The stepper motor is maintained at the constant sheet bypass velocity if it is not necessary to rotate the sheets. For example, it is also possible to feed 8½×11 inch sheets into the SBM long edge first (without rotating) to form pamphlets having a final dimension (after folding) of 4¼×11 inches.

When the printing system of FIG. 1 is operated to produce signature booklets, the final destination of the signature-printed copy sheets output from the duplex paper path is the SBM 200. Accordingly, signature-printed copy sheets are deflected through sheet bypass 180 (rotated by sheet rotator 190 if necessary) and received by saddle stitcher 210. The copy sheets are received on a receiving tray 212 after entering saddle stitcher 210 from sheet bypass 180. The forward movement of the sheets are stopped by a movable gate 214. Gate 214 moves in the direction indicated by line 215 to stop sheets, or permit the sheets to move downstream of saddle stitcher 210. When a booklet is to be formed from a plurality of signature-printed copy sheets, gate 214 remains in the position where it blocks the passage of sheets through saddle stitcher 210. Each sheet is stopped by gate 214, and then tapped by aligner 216 to side register each sheet.

After every copy sheet in a set of copy sheets is stopped by gate 214 and side aligned by aligner 216, stitchers 218 which move in the directions indicated by line 219, move downward to stitch all the signature printed copy sheets in the set to form a stitched set of printed copy sheets. Stitching can include, for example, stapling. After being stitched, the bound set of signature-printed copy sheets is forwarded to folder 230. In order to forward sheets out of saddle stitcher 210, gate 214 is moved so as to unblock the sheet passage out of saddle stitcher 210. Additionally, a sheet conveyor is contacted with the bound set to convey the set out of stitcher 210. The sheet conveyor can comprise, for example, a set of rollers 220 which are selectively movable toward and away from each other to engage and drive or disengage and not drive the set of copy sheets. For one example of a saddle stitcher, see U.S. Pat. No. 4,595,187 to Bober, the disclosure of which is incorporated herein by reference.

Folder 230 receives a set of bound signature-printed copy sheets, the forward motion of which is stopped by sheet stop 232. The set of bound signature-printed copy sheets is then folded by a sheet folder. One type of sheet folder can include a vertically movable folding bar 234 which contacts the signature sheets at a central location thereof (where the signature-printed copy sheets are stitched) and forces the central portion of the set of sheets between folding rollers 236. Folding rollers 236 fold the set of signature-printed copy sheets and convey the set out of folder 230 toward trimmer 250. For further details of folders using a folding bar and a pair of rollers see, for example, U.S. Pat. No. 4,905,977 to Vijuk, the disclosure of which is incorporated herein by reference. Of course, other types of folders such as those disclosed in U.S. Pat. application No. 07/560,812, filed Jul. 31, 1991, now U.S. Pat. No. 5,076,556, to Barry Mandel, the disclosure of which is incorporated herein by reference, can alternatively be used to place folds in sets of copy sheets.

After being folded, the set of signature-printed copy sheets are received on tray 252 of trimmer 250. The forward movement of the folded signature-printed set is stopped by movable sheet stop 254 (which moves in the vertical direction indicated by line 255). After being stopped, the uneven edges of the copy sheets in the folded signature set are trimmed by the cutting blade of trimmer 256 which moves in the vertical direction as indicated by line 257. After being trimmed, the folded signature set (or booklet) is fed by rollers 258 out of trimmer 250 and onto a tray 270 or other type of stacking unit. (The trimming operation is not required for all sets. That is, for example, smaller sized sets may not require trimming.)

The SBM requires an interset interval free of copy sheet deliveries between each set of copy sheets. The interset interval is required so that a first set is sufficiently cleared out of the way for the SBM to start receiving printed copy sheets from a second, subsequent set. The length of the interset interval is a function of pitch mode and set size. Since a lower pitch mode increases the time between the output of adjacent copy sheets from the duplex path, the interset interval usually decreases for the lower (three) pitch mode. Additionally, as the size of the sets increases, a smaller interset interval is required because the second set will remain in the saddle stitcher 210 for a longer time period, and thus it is not necessary for bound sets to be conveyed as far downstream through the SBM before the SBM can start receiving sheets from a new set. Table 3 lists the interset interval for the printing system/SBM combination of FIGS. 1 and 9 for three pitch and seven pitch mode.

TABLE 3

| Set Size (sheets) | Interest Interval (pitches) | |
|---|---|---|
| | 7 pitch mode | 3 pitch mode |
| 1 | 5 | 2 |
| 2 | 4 | 1 |
| ≧3 | 3 | 1 |

It is understood that the locations of the various sheet stops can be adjustable so that the SBM can form signature booklets from copy sheets having a variety of sizes. It is also understood that other types of stitchers, folders and trimmers can be used with the present invention to form signature booklets. The present invention is applicable to finishing devices other than SBMs, and generally to any on-line device located downstream of an imaging system which requires an interset interval of one or more pitches to exist between consecutively output sets of copy sheets.

Additionally, the SBM modules can be modified to stitch standard (non-signature) jobs. Edge stitching is defined as placing one or more stitches along the short or long edge of a set (versus the saddle stitch position). To provide edge stitching with SBM equipment, the stitchers 218 are repositioned within the stitcher module and the folding and trimming modules are bypassed.

D. Sheet Schedulino

In order to reduce the number of skipped pitches which must be inserted between two adjacent sets of copy sheets, while still providing the appropriate interset interval, the present invention utilizes gaps which naturally exist in the output of printed copy sheets from a duplex paper path, and counts these gaps as skipped pitches which would have been inserted otherwise. The gaps which naturally exist in the output of copy sheets from the duplex paper path loop exist because of the feature of duplex printing which requires each copy sheet to circulate through the duplex paper path loop twice. Accordingly, in the present invention, whenever a duplex set (as defined herein, a duplex set is a set of copy sheets having at least one copy sheet which is to be printed on both sides) is output from the duplex paper path, special scheduling algorithms are used to ensure that the appropriate interset interval will exist between two adjacent sets while inserting a minimum number of skipped pitches if necessary.

The sheet scheduling procedures according to the present invention operate locally (at the point at which copy sheets are inserted into the paper path), not predictively. That is, the determinations performed by the sheet scheduler are made based upon information available to the sheet scheduler regarding the current duplex paper path loop contents and the next set of copy sheets to be inserted into the duplex paper path loop. This differs from some printers which lay out the entire job prior to inserting any copy sheets into the duplex paper path. The scheduling procedures of the present invention neither vary the order of copy sheet input (i.e., the order of page images to be formed on the copy sheets) as was done in U.S. Pat. application No. 07/590,236, nor control whether copy sheet insertion should take place in burst or interleave mode (as is done in U.S. Pat. application No. 07/752,108 (JAO 26716)). The sheet order and insertion "mode" determination are made prior to performing the procedures of the present invention. The procedures of the present invention function to determine whether to schedule (insert) a first copy sheet of a set or to schedule (insert) a skipped pitch in order to provide an appropriate interset interval between that set and the previously scheduled set.

Figure 10:
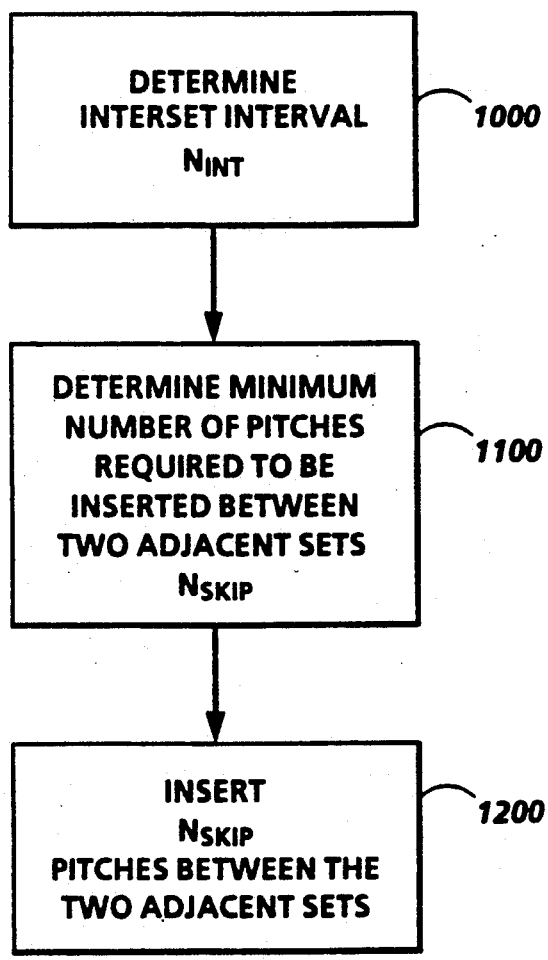
FIG. 10 is a high level flowchart of a scheduling algorithm according to the present invention.

FIG. 10 is a high level flowchart of the basic steps performed in determining the minimum number of skipped pitches which must be inserted after a last copy sheet in a first set to provide an appropriate interset interval $N_{INT}$ between that first set and an immediately adjacent second set. In step 1000, the appropriate interset interval $N_{INT}$ is determined. This can be performed by looking up the value of $N_{INT}$ in a table, corresponding to Table 3, stored in memory. The pitch mode (7 or 3) and set size in Table 3 refer to the second set of two adjacent sets.

In step 1100, the minimum number of skipped pitches, $N_{SKIP}$, required to be inserted between the two adjacent sets of copy sheets to provide the minimum interset interval is determined. This minimum number, $N_{SKIP}$, could be zero, unlike previous devices which always inserted a number of skipped pitches equal to the interset interval $N_{INT}$. See Table 1. Next, in step 1200, the minimum number of skipped pitches $N_{SKIP}$, are inserted between the two adjacent sets of copy sheets.

Figure 11:
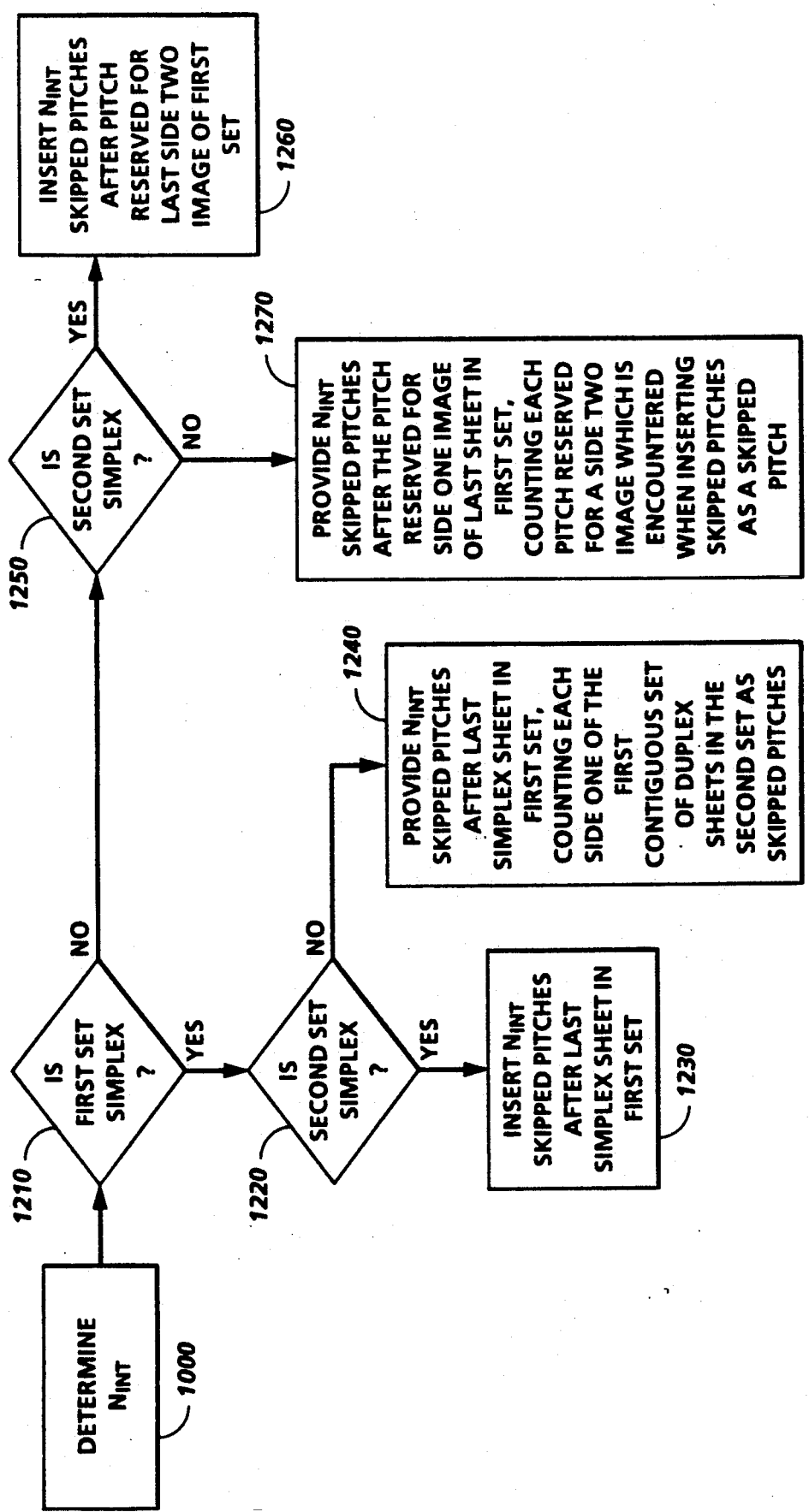
FIG. 11 is an intermediate level flowchart of the scheduling algorithm of the present invention.

FIG. 11 is an intermediate level flowchart of the scheduling algorithm according to the present invention. The interset interval $N_{INT}$ is determined in step 1000. The procedure to be used in providing the interset interval depends on the 'plex (simplex or duplex) of the two adjacent set of copy sheets. A set is duplex if at least one copy sheet of the set is to receive page images on both sides thereof. Otherwise, a set is simplex. Usually most of the copy sheets in a duplex set will contain images on both sides (even though some of these "images" may be blank). The determination of a set's 'plex is made in a conventional manner based upon information available to the sheet scheduling controller.

In step 1210, a determination is made as to whether the first set is simplex. If the first set is simplex, flow proceeds to step 1220 where a determination is made as to whether the second set is simplex. If the first and second sets are simplex, flow proceeds to step 1230 where $N_{INT}$ skipped pitches are inserted after the last simplex sheet in the first set. This procedure is similar to what was done previously (see column A of Table 1) in that a number of pitches equal to the interset interval, $N_{INT}$, will always be inserted between two adjacent simplex sets.

If the first set is simplex and the second set is duplex, flow proceeds to step 1240. In step 1240, one of the sheet scheduling algorithms according to the present invention is utilized to minimize the number of skipped pitches inserted between the first and second adjacent sets of copy sheets. In particular, the interset interval, $N_{INT}$, of skipped pitches is provided after the last simplex sheet in the first set, however each side one of the first contiguous set of duplex sheets in the second set, starting with the first sheet in the second set, is counted as one of the skipped pitches required to provide the interset interval. Accordingly, assuming $N_{INT}=3$, if the first three sheets in the second set are to be duplex printed, the pitches containing these sheets will not output any copy sheets after their first pass through the duplex loop (because they must recirculate to receive their side two image). Thus, the required interset interval of three pitches will be provided automatically after the output of the last sheet from the first set without any skipped pitches being inserted into the duplex paper path loop. The prior art scheduling algorithms would have inserted three skipped pitches after the last simplex sheet of the first set before scheduling the first sheet in the second set for being duplex printed. Accordingly, scheduling begins three pitches earlier (assuming $N_{INT}=3$) with the present invention.

Table 4 compares scheduling which does not combine interset skipped pitches and duplex scheduling, with the present invention which does. The example corresponds to a six sheet simplex set followed by a six sheet duplex set in an eight pitch duplex loop requiring a three pitch interset interval. Accordingly, the left-hand column in Table 4 corresponds to column B in Table 1. As can be seen, three skipped pitches are saved with the present invention, yet the first sheet of the second (duplex) set will not be output until pitch 15, which is 9 pitches after the output of the last sheet in the previous set.

TABLE 4

| Pitch | without combining | with combining |
|---|---|---|
| 1 | set 1, sheet 1 | set 1, sheet 1 |
| 2 | set 1, sheet 2 | set 1, sheet 2 |
| 3 | set 1, sheet 3 | set 1, sheet 3 |
| 4 | set 1, sheet 4 | set 1, sheet 4 |
| 5 | set 1, sheet 5 | set 1, sheet 5 |
| 6 | set 1, sheet 6 | set 1, sheet 6 |
| 7 | skip | set 2, side 1, sheet 1 |
| 8 | skip | set 2, side 1, sheet 2 |
| 9 | skip | set 2, side 1, sheet 3 |
| 10 | set 2, side 1, sheet 1 | set 2, side 1, sheet 4 |
| 11 | set 2, side 1, sheet 2 | set 2, side 1, sheet 5 |
| 12 | set 2, side 1, sheet 3 | set 2, side 1, sheet 6 |
| 13 | set 2, side 1, sheet 4 | |
| 14 | set 2, side 1, sheet 5 | |
| 15 | set 2, side 1, sheet 6 | set 2, side 2, sheet 1 |
| 16 | | set 2, side 2, sheet 2 |
| 17 | | set 2, side 2, sheet 3 |
| 18 | set 2, side 2, sheet 1 | set 2, side 2, sheet 4 |
| 19 | set 2, side 2, sheet 2 | set 2, side 2, sheet 5 |
| 20 | set 2, side 2, sheet 3 | set 2, side 2, sheet 6 |
| 21 | set 2, side 2, sheet 4 | |
| 22 | set 2, side 2, sheet 5 | |
| 23 | set 2, side 2, sheet 6 | |

If the first set is duplex, flow proceeds to step 1250 where a determinatino is made as to whether the second set is simplex. If the second set is simplex, flow proceeds to step 1260. In step 1260, $N_{INT}$ skipped pitches are inserted after the last pitch reserved for the last side 2 image of the first set (which was determined to be duplex in step 1210). This procedure is similar to what was performed previously (see column C of Table 1) in that a number of skipped pitches equal to the interset interval, $N_{INT}$, are always inserted.

If both the first and second sets are duplex, flow proceeds to step 1270. Step 1270 illustrates a second sheet scheduling algorithm according to the present invention. In this second algorithm, the interset interval, $N_{INT}$, of skipped pitches is provided after the pitch reserved for the side one image of the last sheet in the first set. However, instead of automatically inserting three skipped pitches after the pitch containing the side one image of the last sheet in the first set, the present invention counts each pitch reserved for a side two image encountered when inserting skipped pitches as a skipped pitch. Accordingly, assuming $N_{INT}=3$, if one of the pitches encountered when inserting skipped pitches is reserved for receiving a side two image (from set one or an earlier set), only two skipped pitches need to be inserted. Accordingly, the present invention would save one pitch over the prior art method of scheduling.

Table 5 compares scheduling which does not combine interset skipped pitches and duplex scheduling with the present invention. The example corresponds to a first six sheet duplex set followed by a second six sheet duplex set, imaged in an eight pitch duplex loop requiring a three pitch interest interval. Accordingly, the left-hand column in Table 5 corresponds to column D in Table 1. As with previous systems, when providing the interset interval at a duplex/duplex set interface, the present invention begins inserting skipped pitches on the pitch (pitch 7) immediately following the pitch (pitch 6) containing the side one image for the last sheet in the first set. Since duplex scheduling includes: a) inserting a copy sheet in a pitch for its side one image; and b) reserving a pitch for receiving the side two image for that copy sheet, after the copy sheet is inserted into pitch 6, the sheet scheduler has reserved pitches 9-14 for receiving side two images of the first set. The sheet scheduler thus begins inserting skipped pitches with pitch 7. Previously, any pitches which were reserved for receiving side two images were by-passed (considered to be unavailable for scheduling new copy sheets or skipped pitches). Accordingly, with previous scheduling systems, after the first two skipped pitches were inserted on pitches 7 and 8, respectively, pitches 9-14 were considered unavailable, and therefore, the third skipped pitch was inserted on pitch 15 to provide the interset interval.

The present invention makes use of the feature of duplex printing that copy sheets must circulate through the duplex loop twice prior to output therefrom. Accordingly, the present invention counts as a skipped pitch any side two image encountered when inserting skipped pitches. Accordingly, the side 2 image of set 1, sheet 1 scheduled for pitch 9 is counted as one of the three interset interval skipped pitches. Thus, the present invention does not schedule a skipped pitch on pitch 15 because any duplex side one copy sheet scheduled in pitch 15 will not exit the duplex loop until pitch 23, far beyond the three pitch interval required from the last sheet in set one (which is scheduled in pitch 14). Accordingly, in the provided example, the present invention saves one pitch over the prior art. It should be noted that the present invention also correctly does not begin scheduling side one images for the second set in pitches 7 and 8 since these copy sheets would be output in pitches 15 and 16, respectively, and thus would not be appropriately spaced from the last sheet in the first set.

TABLE 5

| Pitch | without combining | with combining |
| --- | --- | --- |
| 1 | set 1, side 1, sheet 1 | set 1, side 1, sheet 1 |
| 2 | set 1, side 1, sheet 2 | set 1, side 1, sheet 2 |
| 3 | set 1, side 1, sheet 3 | set 1, side 1, sheet 3 |
| 4 | set 1, side 1, sheet 4 | set 1, side 1, sheet 4 |
| 5 | set 1, side 1, sheet 5 | set 1, side 1, sheet 5 |
| 6 | set 1, side 1, sheet 6 | set 1, side 1, sheet 6 |
| 7 | skip | skip |
| 8 | skip | skip |
| 9 | set 1, side 2, sheet 1 | set 1, side 2, sheet 1 |
| 10 | set 1, side 2, sheet 2 | set 1, side 2, sheet 2 |
| 11 | set 1, side 2, sheet 3 | set 1, side 2, sheet 3 |
| 12 | set 1, side 2, sheet 4 | set 1, side 2, sheet 4 |
| 13 | set 1, side 2, sheet 5 | set 1, side 2, sheet 5 |
| 14 | set 1, side 2, sheet 6 | set 1, side 2, sheet 6 |
| 15 | skip | set 2, side 1, sheet 1 |
| 16 | set 2, side 1, sheet 1 | set 2, side 1, sheet 2 |
| 17 | set 2, side 1, sheet 2 | set 2, side 1, sheet 3 |
| 18 | set 2, side 1, sheet 3 | set 2, side 1, sheet 4 |
| 19 | set 2, side 1, sheet 4 | set 2, side 1, sheet 5 |
| 20 | set 2, side 1, sheet 5 | set 2, side 1, sheet 6 |
| 21 | set 2, side 1, sheet 6 |  |
| 22 |  |  |
| 23 |  | set 1, side 2, sheet 1 |
| 24 | set 2, side 2, sheet 1 | set 1, side 2, sheet 2 |
| 25 | set 2, side 2, sheet 2 | set 1, side 2, sheet 3 |

FIG. 12 is a flowchart illustrating the application of the present invention to the printing system of FIGs. 1, 3 and 8 combined with the SBM of FIG. 9. The procedure repeats itself each time the last sheet in a current set is scheduled. Scheduling, as defined above, is the insertion of a copy sheet into a pitch of the duplex paper path loop for receiving its side one image, and the reservation of a pitch in the duplex paper path loop for receiving the side two image for that sheet if the sheet is a duplex sheet. Accordingly, the last copy sheet in a current set is scheduled when that copy sheet (simplex or duplex) is inserted into the duplex paper path loop (and the appropriate pitch (if any) is reserved for receiving that sheet's side two image). FIG. 12 illustrates the flow which occurs for any combination of simplex and duplex sets. However, the algorithms according to the present invention are used when the second set is duplex (i.e., previous algorithms are used when the second set is simplex).

In step 1105, the last sheet in the current (first) set is scheduled. Next, in step 1110, the number of contiguous duplex sheets in the next (second) set, $N_{SIDE1}$, starting with the first sheet in the next set is determined. In step 1115, the interset interval, $N_{INT}$, is determined by referring to Table 3 in memory. Flow proceeds to step 1120, where a determination is made as to whether the current set is simplex. If the current set is simplex, flow proceeds to step 1125 where a determination is made as to whether the next set is simplex. If the next set is simplex, flow proceeds to step 1130 where the value of $N_{INT}$ is assigned to a variable $N_{SKIP}$ which represents the number of skips to be inserted after the pitch reserved for the last side 1 of the current set (in this example, skips are only inserted into blank pitches, pitches reserved for receiving side two duplex images are not "counted" as skipped pitches as was done in the FIG. 11 example, instead, the number of inserted skipped pitches $N_{SKIP}$ is reduced if possible).

If the next set is duplex, flow proceeds to step 1140 where the variable $N_{SKIP}$ is assigned the value $N_{INT}-N_{SIDE1}$ ($N_{SKIP} \geq 0$). Flow then proceeds to step 1135 where the appropriate number of skipped pitohes, $N_{SKIP}$, is inserted after the pitch containing the last side one image of the current set. At this point, the next set can be scheduled. Accordingly, in the flowchart of FIG. 12, the next set becomes the current set in step 1165, and scheduling of the current set is performed in step 1170 until the last sheet in the current set is scheduled in step 1105.

If the first set is determined to be duplex in step 1120, flow proceeds to step 1145, where a determination is made as to whether the next set is simplex. If the next set is simplex, flow proceeds to step 1150, where a number of skipped pitches equal to the interset interval, $N_{INT}$, is inserted after the pitch reserved for the last side two image of the current set. Flow then proceeds to steps 1165 and 1170 so that the next set of sheets are scheduled.

If the first and second sets of sheets are duplex, flow proceeds to step 1155. In step 1155, the number of pitches reserved for side 2 duplex sheets, $N_{SIDE2}$, which occur within the $N_{INT}$ pitches following the pitch containing the last side 1 image for the ourrent set is determined. Thus, the value of $N_{SIDE2}$ is the number of pitches which do not need to be skipped in order to proVide the interset interval between the output of the last sheet in the current set and the output of the first sheet in the next set. With reference to Table 5, after scheduling the last set one sheet in pitch 6, the present invention analyzes the next three pitches ($N_{INT}=3$). Of these next three pitches, one (pitch 9) is reserved for a side two image. Accordingly, $N_{SIDE2}=1$. In step 1160, the variable $N_{SKIP}$ is assigned to value of $N_{INT}-N_{SIDE2}$ ($N_{SKIP}\geq 0$), to determine the number of skipped pitches which actually must be inserted. Thus, $N_{SKIP}=3-1=2$. Flow then proceeds to step 1135 where the appropriate number of skipped pitches, $N_{SKIP}$, are inserted after the pitch which is to receive the side one image of the last sheet in the current set.

Tables 6-8 illustrate software which can be used to perform the duplex/duplex set interface determinations illustrated in boxes 1155 and 1160 of the flowchart of FIG. 12. Table 6 is a procedure for subtracting the value of $N_{SIDE2}$ (referred to as "duplexSidesInPath") from the value of $N_{INT}$ (referred to as "intersetSkips"), and inserting the appropriate number of skips in the paper path. The value of intersetSkips is determined by calling the Table 7 function which assigns the appropriate value of $N_{INT}$ to intersetSkips. These values correspond to the values shown in Table 3. The procedure of Table 6 also adjusts the value of intersetSkips by a value stored in NVM (non-volatile memory).

The function of Table 8 determines the number of side two pitches ($N_{SIDE2}$) which can be counted towards the interset interval skipped pitches. This function receives the value of intersetSkips ($N_{INT}$) and determines how many side two sheets occur in the $N_{INT}$ pitches immediately following the pitch which will receive the last side one image of the first set. This function considers any pitches which are not blank (e.g., reserved for receiving a side two image) as a "nonZeroEvent". The total number of "nonZeroEvents" which occur in the "intersetSkip" pitches after the last scheduled pitch (the pitch scheduled to receive the side one image of the last sheet in the first set: pitch 6 in Table 5) is returned by the Table 8 function and subtracted from the value of intersetSkip ($N_{INT}$) determined by the Table 6 procedure.

The Table 8 function looks at an array, set up in memory, which represents the contents of the duplex paper path loop. The function looks at a "window" in that array having a length (in pitches) equal to the interset interval $N_{INT}$, and determines how many side two images (nonzero events) are scheduled in that window.

Forming arrays for looking at the contents of a duplex loop (as is done in the Table 8 function) is known, as is the Table 7 function for determining the value of "intersetSkip" ($N_{INT}$). However, "looking into" the duplex loop by a number of pitches equal to the interset interval ("intersetSkips") as done in the Table 8 function is new. Moreover, the number of skipped pitches inserted to provide the interset interval has not been reduced as is done in the Table 6 procedure.

TABLE 6

[intersetSkips] ← BypassSkips[ ];
[duplexSidesInPath] ← CheckDuplexEvents[intersetSkips];
ExecuteSkip[intersetSkips - duplexSidesInPath, none];
END IF;

TABLE 7

ENTER
  IF collationMode = uncollatedStacks
  THEN
    setSize ← copiesInJob;
  ELSE
    setSize ← pagesInSet;
  END IF;
  IF pitchMode = 3
  THEN
    IF setSize = 1
    THEN
      intersetSkips ← 2;
    ELSE
      intersetSkips ← 1;
    END IF;
  ELSE -- pitchMode = 7
    IF setSize = 1
    THEN
      intersetSkips ← 5;
    ELSIF setSize = 2
    THEN
      intersetSkips ← 4;
    ELSEIF setSize = 3
    THEN
      intersetSkips ← 3;
    ELSE
      intersetSkips ← 2;
    END IF;
  END IF;
  RETURN[intersetSkips];
END PROCEDURE BypassSkips;

TABLE 8

CheckDuplexEvents:PUBLIC PROCEDURE[counter: SHORT CARDINAL]
    RETURNS[SHORT CARDINAL] =
  localpointer: SHORT CARDINAL
  nonZeroEvents: SHORT CARDINAL
ENTER -- The number this returns is only valid if there are no
    NOPRINTS from the --ESS. see PreUpdateDuplexStructure.
IF counter > = pathLength;
THEN
  counter ← pathLength
END IF;
localpointer ← nextEvent;

TABLE 8-continued

```
nonZeroEvents ← 0;
WHILE counter > 0 LOOP
  IF duplexEvents[localpointer] <> NIL
  THEN
    nonZeroEvents ← nonZeroEvents + 1;
  END IF;
  localpointer ← localpointer + 1;
  IF localpointer = pathLength
  THEN
    localpointer ← 0;
  END IF;
    counter ← counter − 1;
  END LOOP;
  RETURN[nonZeroEvents];
END PROCEDURE CheckDuplexEvents
```

Table 9 illustrates a series of copy sets scheduled without combining duplex scheduling and interset intervals compared with the present invention. Each duplex set is denoted by a letter (A-D). The image side is indicated by a number (1 or 2) after the letter. This example assumes an eight pitch duplex loop (7 pitch mode) with the interset intervals being determined according to Table 3.

TABLE 9

| Pitch | without combining | with combining |
|---|---|---|
| 1 | A1 | A1 |
| 2 | A1 | A1 |
| 3 | A1 | A1 |
| 4 | | |
| 5 | | |
| 6 | | |
| 7 | B1 | B1 |
| 8 | | |
| 9 | A2 | A2 |
| 10 | A2 | A2 |
| 11 | A2 | A2 |
| 12 | | |
| 13 | | C1 |
| 14 | | |
| 15 | B2 | B2 |
| 16 | | |
| 17 | C1 | |
| 18 | | |
| 19 | | D1 |
| 20 | | |
| 21 | | C2 |
| 22 | D1 | |
| 23 | | |

Table 9 illustrates that the reduction in skipped pitches depends on the set sizes at each duplex set boundary. However, it can be seen that the cumulative effect of the present invention can be considerable. Table 9 also illustrates that any side two image (not only imges from the immediately previous set) is used to reduce skipped pitches. For example, when inserting skipped pitches between sets B and C, the three side two sheets from set A (pitches 9-11) are used to reduce the number of inserted skipped pitches from 5 to 2. That is, only two skipped pitches (pitches 8 and 12) are inserted after the pitch containing the last side one image of set B.

The algorithms illustrated in FIGS. 11 and 12 function to provide the appropriate interset interval between adjacent sets of copy sheets regardless of whether the copy sheets are being scheduled in a burst mode or an interleave mode. Moreover, when sheets are scheduled using a printing system that includes a duplex paper path having a buffer tray, the algorithm illustrated in steps 1140 and 1240 is used when the second set is duplex regardless of the 'plex of the first set. Since all the side one images of a first set are collected in an inverting buffer tray, the scheduling of adjacent duplex sets is more like scheduling a duplex set after a simplex set. This is true because copy sheets from a second set cannot be scheduled until the last side one imaged duplex sheet from a first set is fed from the buffer tray. Accordingly, since the copy sheets located immediately prior to the side one duplex sheets of the second set will exit the duplex paper path after receiving their next image, such sheets are like simplex sheets.

While the present invention is described with reference to a preferred embodiment, this particular embodiment is intended to be illustrative, not limiting. In particular, the present invention is applicable to any situation where an interset interval is required between adjacent sets of copy sheets due to the "slowness" of an on-line finishing device located downstream of an imaging device. The SBM discussed above is only one example of such a finishing device requiring an interset interval. Various modifications may be made without departing from the spirit and scope of the invention as defined in the appended claims.

What is claimed is:

1. A method of scheduling a plurality of sets of copy sheets for being printed selectively on one or both sides and with an interset interval of pitches being provided between each consecutive set of copy sheets, at least some of the copy sheets in a second one of two adjacent sets of copy sheets being printed on both sides, said method comprising the steps of:
   a) determining the interset interval, $N_{INT}$, of pitches required between said two adjacent sets of copy sheets;
   b) determining a minimum number of skipped pitches, $N_{SKIP}$, required to be inserted between said two adjacent sets of copy sheets to proVide said determined interset interval; and
   c) inserting said minimum number of skipped pitches, $N_{SKIP}$, between said two adjacent sets of copy sheets.

2. The method of claim 1, wherein said minimum number, $N_{SKIP}$, varies for sets of copy sheets having a constant size depending on whether any copy sheets in a first one of said two adjacent sets of copy sheets are to be printed with images on both sides.

3. The method of claim 1, wherein determining said minimum number of skipped pitches, $N_{SKIP}$, includes: determining a number, $N_{SIDE1}$, of contiguous sheets in said second set of copy sheets which will receive an image on both sides, starting with a first sheet in said second set.

4. The method of claim 3, wherein:

$N_{SKIP} = N_{INT} - N_{SIDE1}$, where $N_{SKIP} \geq 0$, if copy sheets in a first set of said adjacent sets of copy sheets are to be printed only on one side.

5. The method of claim 3, wherein:

$N_{SKIP} = N_{INT} - N_{SIDE1}$, where $N_{SKIP} \geq 0$, if said copy sheets are scheduled for having said images formed by an imaging system having a duplex paper path loop which includes a buffering inverter tray.

6. The method of claim 1, wherein if at least some of the copy sheets in a first one of said two adjacent sets of copy sheets are to be printed with images on both sides, $N_{SKIP} = N_{INT} - N_{SIDE2}$, where $N_{SKIP} \geq 0$, and $N_{SIDE2}$ is a number of pitches reserved for receiving side two images and within the $N_{INT}$ pitches immediately following a pitch which is scheduled to receive the side one image of a last sheet in said first set.

7. The method of claim 1, wherein said scheduling is performed by an imaging system having an endless duplex paper path loop providing a plural copy sheet capacity duplexing path for recirculating therein plural copy sheets imaged on one side back to be imaged on their opposite side to make duplex copies, said endless duplex paper path loop including an insertion station where copy sheets are inserted into said endless duplex paper path loop, an imaging station where images are formed on said copy sheets, an output station where imaged copy sheets are output from said endless duplex paper path loop, and a sheet inverter for inverting duplex copy sheets imaged on one side prior to performing imaging on a second side, wherein said scheduling includes scheduling copy sheets for simplex imaging by determining a pitch of said endless duplex paper path loop into which the copy sheet will be inserted and imaged on one side, and scheduling copy sheets for duplex imaging by determining a pitch of said endless duplex paper path loop into which the copy sheet will be inserted and imaged on side one, said same pitch being reserved for said same copy sheet to receive its side two image upon being recirculated back to said imaging station.

8. A method of scheduling a plurality of sets of copy sheets for insertion into, forming of images on, and outputting from an imaging system, said imaging system having an endless duplex paper path loop providing a plural copy sheet capacity duplexing path equal to a plurality of pitches for recirculating therein plural copy sheets imaged on one side back to be imaged on their opposite side to make duplex copies, said imaging system including means for forming images on copy sheets in a portion of said duplex paper path loop, means for inverting copy sheets imaged on one side prior to being recirculated back to be imaged on their opposite side, and control means for controlling the flow of copy sheets through said duplex paper path loop so that copy sheets to be duplex imaged are inverted and recirculated back to said means for forming images after being imaged on one side while copy sheets to be simplex imaged are output from said duplex paper path loop after being imaged on one side, said scheduling including scheduling copy sheets for simplex imaging by determining a pitch of said duplex paper path loop into which the copy sheet will be inserted and imaged on one side, and scheduling copy sheets for duplex imaging by determining a pitch of said duplex paper path loop into which the copy sheet will be inserted and imaged on side one, said same pitch being reserved for said same copy sheet to receive its side two image upon being recirculated back to said means for forming images, said scheduling also including providing an interset interval of pitches, $N_{INT}$, between the output of a final copy sheet of a first set and the output of a first sheet of an immediately subsequent second set from said endless duplex paper path loop, said method comprising the steps of:

a) determining the interset interval $N_{INT}$;

b) providing NINT skipped pitches after a pitch containing a last sheet of said first set by scheduling the insertion of NINT skipped pitches after the pitch containing said last sheet in said first set; and c) wherein if said first set is a simplex set and at least some of said copy sheets in said second set are to be duplex imaged, each copy sheet in a contiguous group of copy sheets to be duplex imaged in said second set, starting with the first copy sheet in said second set, is counted as a skipped pitch.

9. A method of scheduling a plurality of sets of copy sheets for insertion into, forming of images on, and outputting from an imaging system, said imaging system having an endless duplex paper path loop providing a plural copy sheet capacity duplexing path equal to a plurality of pitches for recirculating therein plural copy sheets imaged on one side back to be imaged on their opposite side to make duplex copies, said imaging system including means for forming images on copy sheets in a portion of said duplex paper path loop, means for inverting copy sheets imaged on one side prior to being recirculated back to be imaged on their opposite side, and control means for controlling the flow of copy sheets through said duplex paper path loop so that copy sheets to be duplex imaged are inverted and immediately recirculated back to said means for forming images after being imaged on one side while copy sheets to be simplex imaged are output from said duplex paper path loop after being imaged on one side, said scheduling including scheduling copy sheets for simplex imaging by determining a pitch of said duplex paper path loop into which the copy sheet will be inserted and imaged on one side and scheduling copy sheets for duplex imaging by determining a pitch of said duplex paper path loop into which the copy sheet will be inserted and imaged on side one, said same pitch being reserved for said same copy sheet to receive its side two image upon being recirculated back to said means for forming images, said scheduling also including providing an interset interval of pitches, $N_{INT}$, between the output of a final copy sheet of a first set and the output of a first copy sheet of an immediately subsequent second set from said endless duplex paper path loop, said method comprising the steps of:

a) determining the interset interval $N_{INT}$;

b) providing $N_{INT}$ skipped pitches after a pitch soheduled to reoeive the side one image of a last sheet in said first set by scheduling the insertion of $N_{INT}$ skipped pitches after the pitch scheduled to receive the side one image of the last sheet in said first set; and c) wherein if at least some of the copy sheets in both said first and second sets are to be duplex imaged, each pitch reserved for receiving a side two image encountered when inserting said skipped pitches is counted as a skipped pitch.

10. A method of scheduling a plurality of sets of copy sheets for insertion into, forming of images on, and output from an imaging system, said imaging system having an endless duplex paper path loop providing a plural copy sheet capacity duplexing path equal to a plurality of pitches for recirculating therein plural copy sheets imaged on one side back to be imaged on their opposite side to make duplex copies, said imaging system including means for forming images on copy sheets in a portion of said duplex paper path loop, means for inverting copy sheets imaged on one side prior to being recirculated back to be imaged on their opposite side, and control means for controlling the flow of copy sheets through said duplex paper path loop so that copy sheets to be duplex imaged are inverted and immediately recirculated back to said means for forming images after being imaged on one side while copy sheets to be simplex imaged are output from said duplex paper path loop after being imaged on one side, said scheduling including scheduling copy sheets for simplex imaging by determining a pitch of said duplex paper path loop into which the copy sheet will be inserted and imaged on one side, and scheduling copy sheets for duplex imaging by determining a pitch of said duplex paper path loop into which the copy sheet will be inserted and imaged on side one, said same pitch being reserved for said same copy sheet to receive its side two image upon being recirculated back to said means for forming images, said scheduling also including providing an interset interval of pitches between the output of a final copy sheet of a first set and the output of a first copy sheet of an immediately subsequent second set from said endless duplex paper path loop, the method comprising the steps of:

a) determining the interset interval, $N_{INT}$, to be provided between said first set and said second set; and b) inserting $N_{SKIP}$ skipped pitches after a pitch containing the last simplex sheet of said first set, where $N_{SKIP}=N_{INT}$ if all copy sheets in said first set and in said second set are to be simplex imaged, otherwise;

c) inserting $N_{SKIP}$ skipped pitches after a pitch reserved for receiving the side two image of the last copy sheet in said first set, where $N_{SKIP}=N_{INT}$ if said first set contains at least some copy sheets to be duplex imaged and all copy sheets in said second set are to be simplex imaged, otherwise;

d) inserting $N_{SKIP}$ skipped pitches after a pitch containing the last simplex sheet of said first set, where $N_{SKIP}=N_{INT}-N_{SIDE1}$, $N_{SIDE1}$ is a number of contiguous copy sheets in said second set which Will be duplex imaged, starting with a first copy sheet in said second set, and $N_{SKIP} \geq 0$, if all copy sheets in said first set are to be simplex imaged, and at least some copy sheets in said second set are to be duplex imaged, otherwise;

e) inserting $N_{SKIP}$ skipped pitches after the pitch reserved for receiving the side one image of the last duplex copy sheet in said first set, if both said first set and said second set contain at least some copy sheets which are to be duplex imaged, where $N_{SKIP}=N_{INT}-N_{SIDE2}$, $N_{SKIP} \geq 0$, and $N_{SIDE2}$ is a number of pitches reserved for receiving side two images, located within $N_{INT}$ pitches immediately following a pitch which is scheduled to receive the side one image of said last sheet in said first set.

* * * * *